(12) United States Patent
Wahl et al.

(10) Patent No.: US 11,988,295 B1
(45) Date of Patent: May 21, 2024

(54) CONTROLLABLE VARIABLE FLOW VALVE HAVING PIVOTING FOOT WITH ABUTTING HEEL

(71) Applicant: Namara Water Technologies, Inc., San Diego, CA (US)

(72) Inventors: Michael Hermann Wahl, Bonita, CA (US); Patrick R. Lee, San Diego, CA (US); Robert Michael Cram, Ramona, CA (US)

(73) Assignee: Namara Water Technologies, Inc., San Diego, CA (US)

( * ) Notice: Subject to any disclaimer, the term of this patent is extended or adjusted under 35 U.S.C. 154(b) by 0 days.

(21) Appl. No.: 18/219,059

(22) Filed: Jul. 6, 2023

Related U.S. Application Data

(60) Provisional application No. 63/444,995, filed on Feb. 12, 2023, provisional application No. 63/444,996, filed on Feb. 12, 2023.

(51) Int. Cl.
*F16K 3/24* (2006.01)
*F16K 1/16* (2006.01)
(Continued)

(52) U.S. Cl.
CPC ............... *F16K 27/02* (2013.01); *F16K 1/16* (2013.01); *F16K 1/36* (2013.01); *F16K 3/246* (2013.01);
(Continued)

(58) Field of Classification Search
CPC . F16K 1/16; F16K 1/165; F16K 1/443; F16K 27/02; F16K 1/36; F16K 37/005;
(Continued)

(56) References Cited

U.S. PATENT DOCUMENTS 2,020,286 A 11/1935 Bittle
2,244,986 A 6/1941 Drane
(Continued)

FOREIGN PATENT DOCUMENTS

EP 0092495 A1 10/1983
EP 0818646 A1 1/1998
(Continued)

OTHER PUBLICATIONS

Danfoss Data Sheet: H Series Motorised Valves Rotary-Shoe and Paddle Types, P/N 226v08, Dec. 2007, 4 pages.
(Continued)

*Primary Examiner* — Marina A Tietjen
(74) *Attorney, Agent, or Firm* — Barcelo, Harrison & Walker, LLP; Joshua C. Harrison

(57) ABSTRACT

A novel fluid valve system includes a housing defining a fluid path between first and second ports. The housing preferably includes an interior cylindrically-arcuate surface that defines a center of curvature, with the fluid flow path passing through an opening in the interior cylindrically-arcuate surface. The fluid valve may include a foot having a bottom and a heel, with the bottom facing the interior cylindrically-arcuate surface, and with the heel disposed transverse to the bottom. The foot may extend in a radial direction away from the center of curvature, with the foot pivoting within an operational angular range about the center of curvature. The bottom of the foot may be configured to translate over the opening in the interior cylindrically-arcuate surface, and the heel may be configured to abut the second port with the foot pivoted to a closed position of the operational angular range.

17 Claims, 31 Drawing Sheets

(51) Int. Cl.
*F16K 1/36* (2006.01)
*F16K 3/34* (2006.01)
*F16K 15/02* (2006.01)
*F16K 15/18* (2006.01)
*F16K 27/02* (2006.01)
*F16K 31/04* (2006.01)
*F16K 37/00* (2006.01)

(52) U.S. Cl.
CPC .............. *F16K 3/34* (2013.01); *F16K 15/025* (2013.01); *F16K 15/184* (2021.08); *F16K 31/04* (2013.01); *F16K 37/005* (2013.01)

(58) Field of Classification Search
CPC ... F16K 3/246; F16K 3/32; F16K 3/34; F16K 5/04; F16K 1/12; F16K 5/12; F16K 15/184; F16K 15/025
USPC .......................................... 251/298, 301, 302
See application file for complete search history.

(56) References Cited

U.S. PATENT DOCUMENTS

| | | | |
|---|---|---|---|
| 2,999,666 | A | 9/1961 | Sjogren |
| 3,270,775 | A | 9/1966 | Alderson |
| 3,693,660 | A | 9/1972 | Wheelock |
| 3,995,660 | A | 12/1976 | Kast |
| 4,589,435 | A | 5/1986 | Aldrich |
| 4,718,457 | A | 1/1988 | Luger |
| 5,000,224 | A | 3/1991 | Olson, Jr. et al. |
| 5,004,014 | A | 4/1991 | Bender |
| 5,038,820 | A | 8/1991 | Ames et al. |
| 5,251,653 | A | 10/1993 | Tucker et al. |
| 5,287,884 | A | 2/1994 | Cohen |
| 5,305,986 | A | 4/1994 | Hunt |
| 5,402,815 | A | 4/1995 | Hoch, Jr. et al. |
| 5,409,037 | A | 4/1995 | Wheeler et al. |
| 5,503,175 | A | 4/1996 | Ravilious et al. |
| 5,526,679 | A | 6/1996 | Filippi et al. |
| 5,971,011 | A | 10/1999 | Price |
| 6,105,607 | A | 8/2000 | Caise et al. |
| 6,317,051 | B1 | 11/2001 | Cohen |
| 6,543,479 | B2 | 4/2003 | Coffey et al. |
| 6,691,724 | B2 | 2/2004 | Ford |
| 6,708,722 | B1 | 3/2004 | Goodenough |
| 7,174,771 | B2 | 2/2007 | Cooper |
| 7,204,270 | B2 | 4/2007 | Hendrix |
| 7,970,715 | B2 | 6/2011 | Al-Harbi et al. |
| 8,606,413 | B2 | 12/2013 | Picton |
| 8,939,016 | B2 | 1/2015 | Brasel et al. |
| 9,127,443 | B1 | 9/2015 | Raffaldt |
| 9,151,022 | B2 | 10/2015 | Patel et al. |
| 10,229,579 | B2 | 3/2019 | Alcorn et al. |
| 10,428,495 | B2 | 10/2019 | Halimi |
| 10,527,516 | B2 | 1/2020 | Banerjee et al. |
| 10,633,842 | B2 | 4/2020 | Tayenaka et al. |
| 11,053,668 | B1 | 7/2021 | Manning et al. |
| 11,274,749 | B1 | 3/2022 | Thurston et al. |
| 2010/0175766 | A1 | 7/2010 | Lichman |
| 2010/0204839 | A1 | 8/2010 | Behm et al. |
| 2015/0376874 | A1 | 12/2015 | Breedlove |
| 2016/0258144 | A1 | 9/2016 | Tayenaka et al. |
| 2016/0356026 | A1 | 12/2016 | Engler |
| 2017/0218607 | A1 | 8/2017 | Woods |
| 2018/0230681 | A1 | 8/2018 | Poojary et al. |
| 2019/0063689 | A1 | 2/2019 | Liu et al. |
| 2020/0393324 | A1 | 12/2020 | Rudd et al. |

FOREIGN PATENT DOCUMENTS

| | | | |
|---|---|---|---|
| EP | 3115666 A1 | 1/2017 | |
| JP | 56156576 A | * 12/1981 | ............. E03D 11/00 |
| KR | 2014116290 A | * 10/2014 | ............. E03D 11/00 |
| WO | 2020154384 A1 | 7/2020 | |

OTHER PUBLICATIONS

Moen Flo Valve Products, Illustrated Parts Reference Guide, downloaded from www.moen.com on Jul. 29, 2023, 88 pages.

* cited by examiner

CONTROLLABLE VARIABLE FLOW VALVE HAVING PIVOTING FOOT WITH ABUTTING HEEL

CROSS-REFERENCE TO RELATED APPLICATIONS

This non-provisional patent application claims priority to U.S. Provisional App. 63/444,995 filed 2023 Feb. 12 and to U.S. Provisional App. 63/444,996 filed 2023 Feb. 12.

BACKGROUND

Some prior so-called "smart" valve systems have attempted to track residential or business water usage and pressure, or communicate with or be controlled by a user or host wirelessly, or limit flooding damage by autonomously shutting off if a downstream leak is sensed or otherwise determined. However, the performance of such a system is typically limited by the design and structure of the valve components used therein. Hence, there is a need in the art for an improved fluid valve system that can be controlled to adjust or completely close off water flow through the main supply of a residential or commercial building, or that can be controlled remotely, selectively, or autonomously to maintain a desired non-zero flow rate when not completely closed.

There is also a need in the art for an improved fluid valve that better facilitates flow, pressure, or downstream leak sensing or control, or that is sized and configured for improved compatibility with existing water main supplies for residential or commercial buildings, or that can be practically opened, controlled, or completely closed with less actuation force or torque, or that otherwise has improved performance, reliability, or affordability.

SUMMARY

A novel fluid valve system includes a housing that defines a fluid flow path between first and second ports. The housing preferably includes an interior cylindrically-arcuate surface that defines a center of curvature, with the fluid flow path passing through an opening in the interior cylindrically-arcuate surface. Such an example fluid valve may also include a foot having a bottom and a heel, with the bottom facing the interior cylindrically-arcuate surface, and with the heel disposed transverse to the bottom. The foot may extend in a radial direction away from the center of curvature, with the foot pivoting within an operational angular range about the center of curvature. The bottom of the foot may be configured to translate over the opening in the interior cylindrically-arcuate surface, and the heel may be configured to abut the second port with the foot pivoted to a closed position of the operational angular range.

BRIEF DESCRIPTION OF THE DRAWINGS

For the purposes of illustration rather than limitation, certain example embodiments are depicted in the figures.

DESCRIPTION OF EXAMPLE EMBODIMENTS

Figure 1:
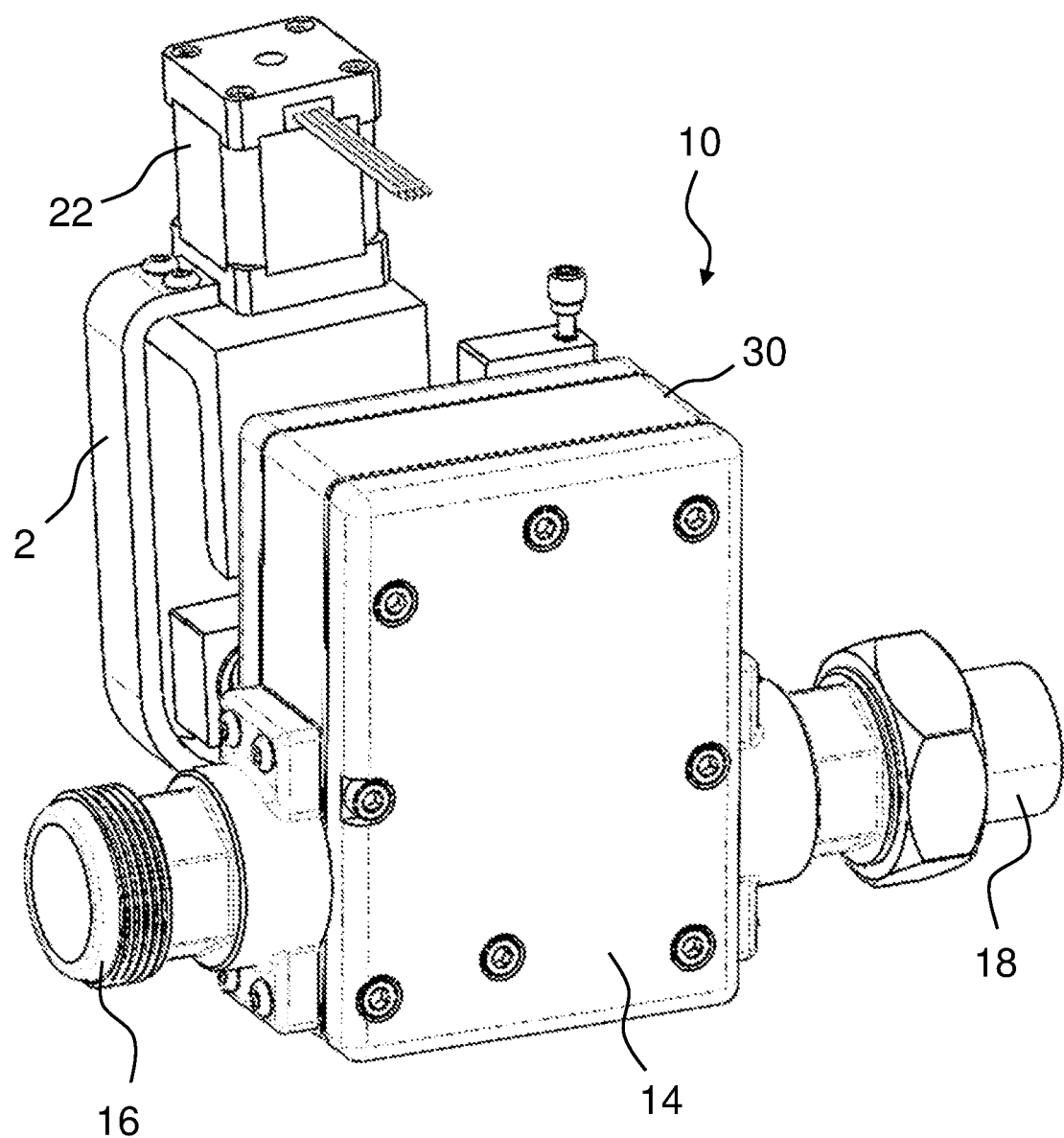
FIG. 1 is a front perspective view of a valve system according to an example embodiment of the present invention.
Figure 2A:
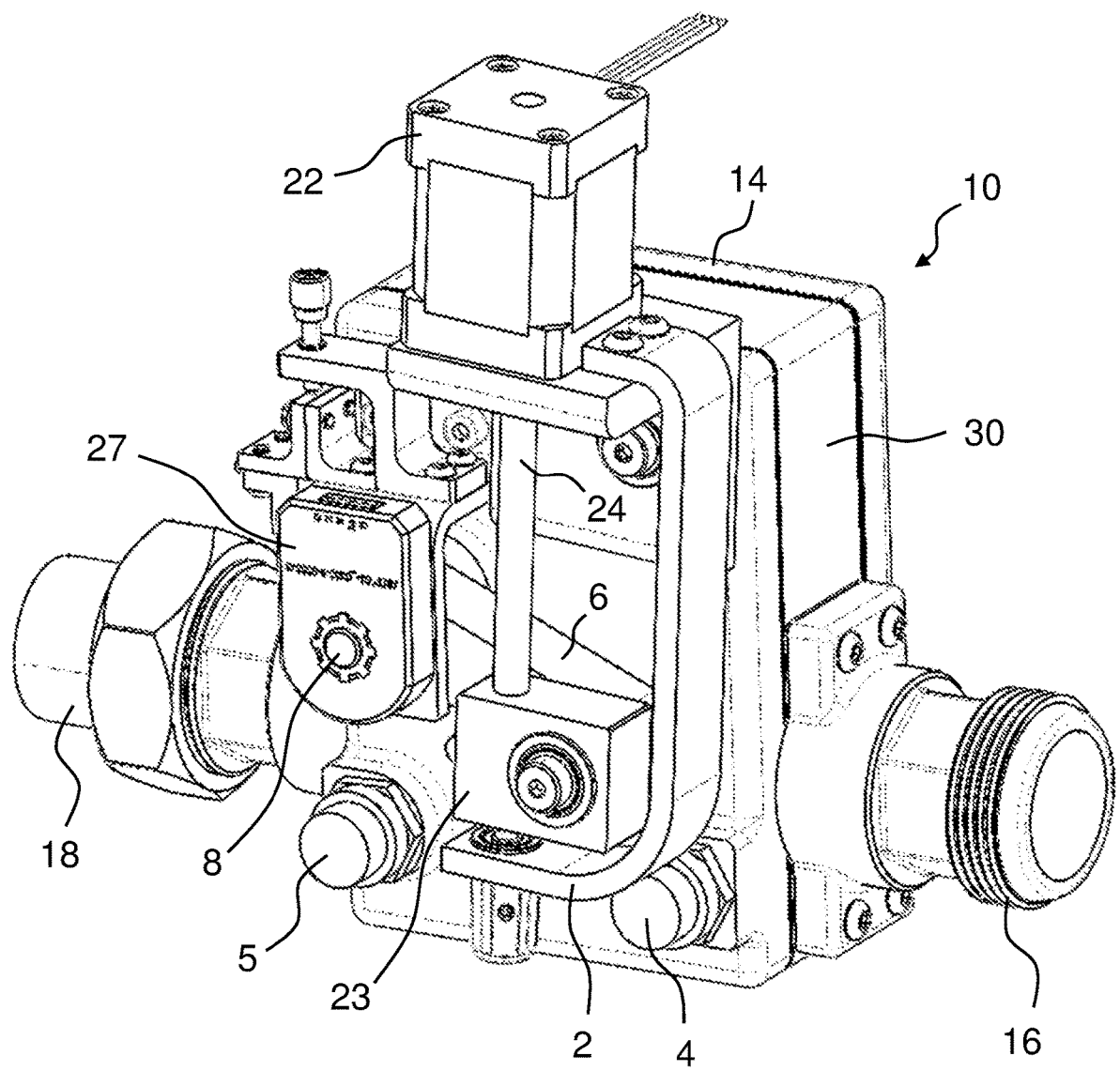
FIG. 2A is a back perspective view of the example valve system of FIG. 1.

FIG. 1 is a front perspective view of a valve system 10 according to an example embodiment of the present invention. FIG. 2A is a back perspective view of the example valve system 10. In the example embodiment of FIG. 1, the fluid valve system 10 has a housing 30, a front cover 14, a first port 16 and a second port 18, and can selectively interrupt or control a rate of flow through a fluid flow path between the first and second ports 16, 18. The example valve system 10 optionally includes a first conventional pressure sensor 4 that can sense a fluid pressure corresponding to the fluid pressure at the first port 16, and a second conventional pressure sensor 5 that can sense a fluid pressure corresponding to the fluid pressure at the second port 18. The first and second ports 16, 18 of the example valve system 10 are preferably designed (or include adapters selected for) compatibility with an existing piping system application (e.g., a residential water main). The adapters shown in FIGS. 1 and 2A are not prescriptive but rather are merely optional non-limiting examples to indicate the diversity of adapters that might be used.

In the embodiment of FIGS. 1-2A, the valve system 10 may further include a valve actuation mechanism 2 that includes a motor 22 that turns a lead screw 24 having a bearing captured distal end. In certain embodiments, the motor 22 may be a controllable electric motor such as a stepper motor that is integrated with the lead screw 24. In certain embodiments, the lead screw 24 may move a lead screw nut 23 that is attached to a lever 6 that turns a valve pivot shaft 8. The valve system 10 may optionally further include a rotary encoder 27 to provide feedback of the rotational position of the valve pivot shaft 8 to a controller.

Figure 2B:
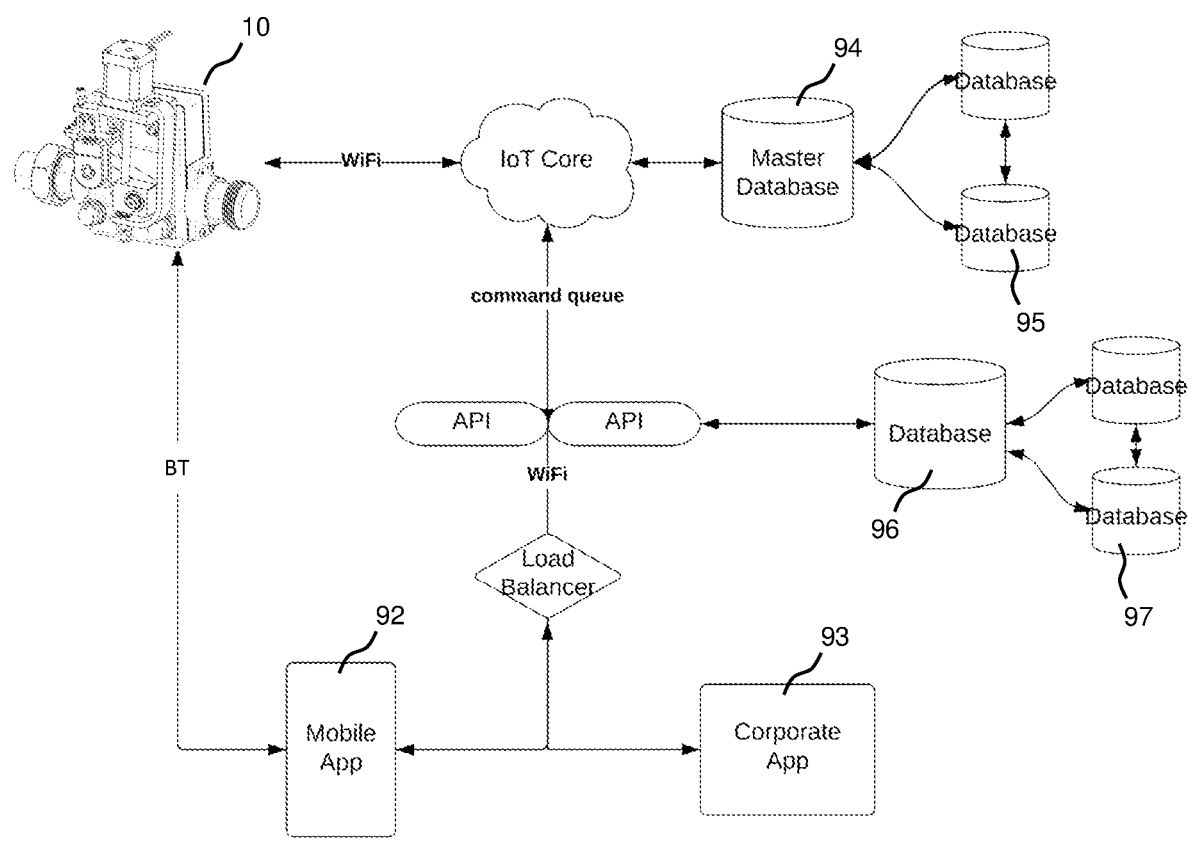
FIG. 2B is a block diagram depicting the example valve system of FIG. 2A used as a smart valve in an internet of things (IOT) application environment.

FIG. 2B is a block diagram depicting the example valve system 10 used as a so-called "smart valve" in an internet of things (IOT) application environment. In certain embodiments, the example valve system 10 may include a conventional processor, memory, controller, and communication electronics to exchange data, status, and instructions with other components or nodes in an IOT ecosystem. For example, and as shown in the block diagram of FIG. 2B, the example valve system 10 may communicate wirelessly using conventional WiFi electronics and protocols with mobile devices and/or the internet to exchange data about residential or business water usage, pressures, or flow rates, user or host preferences or commands, valve position status, and/or data relevant to future or past valve positions such as weather prediction data or desired flow rate schedules. Such data may be stored or retrieved from remote databases 94, 95, 96, 97, and commands and user interfaces may be initialized and operated by one or more instances 92, 93 of application software that may be in communication with the example valve system 10.

Figure 3:
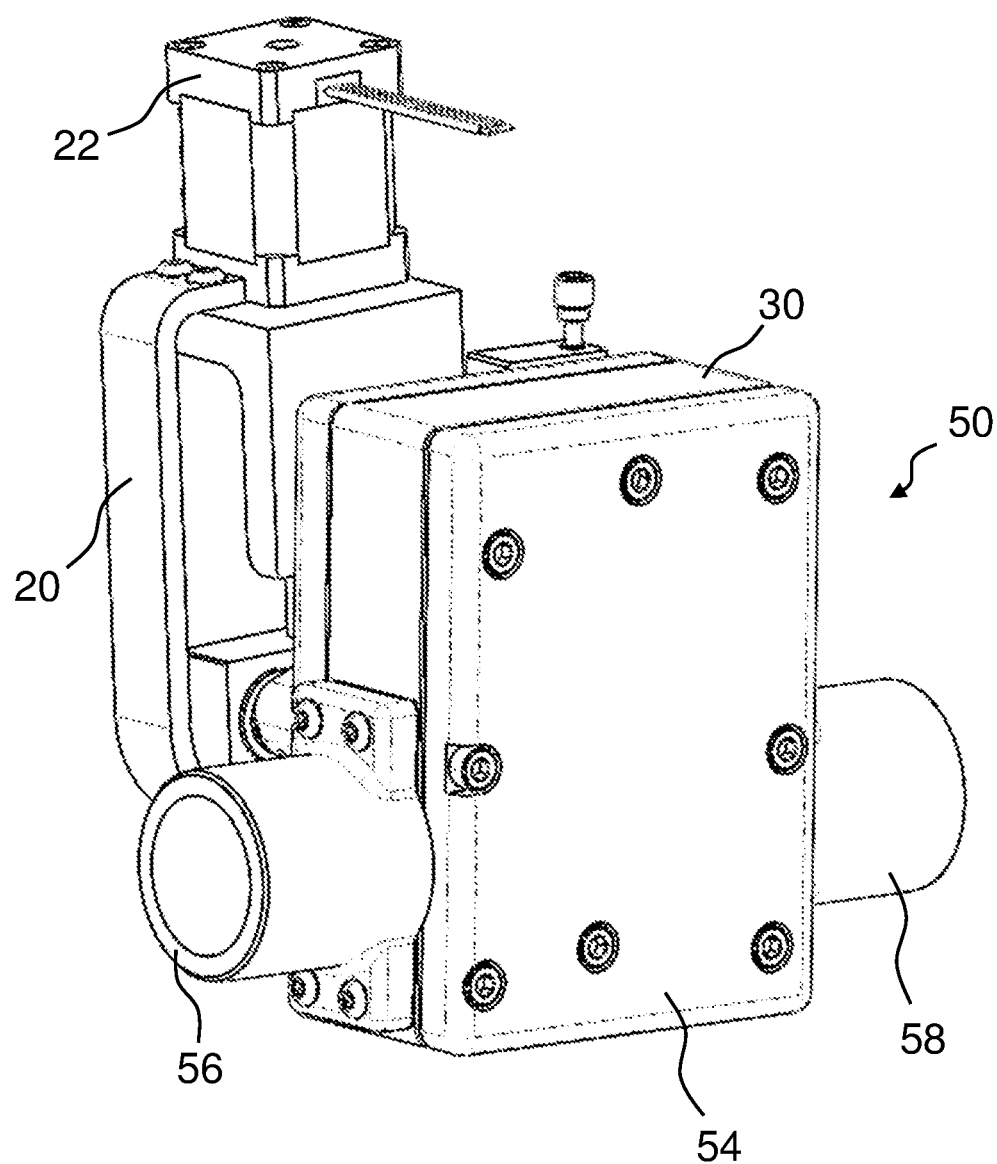
FIG. 3 is a front perspective view of a valve system according to another example embodiment of the present invention.
Figure 4:
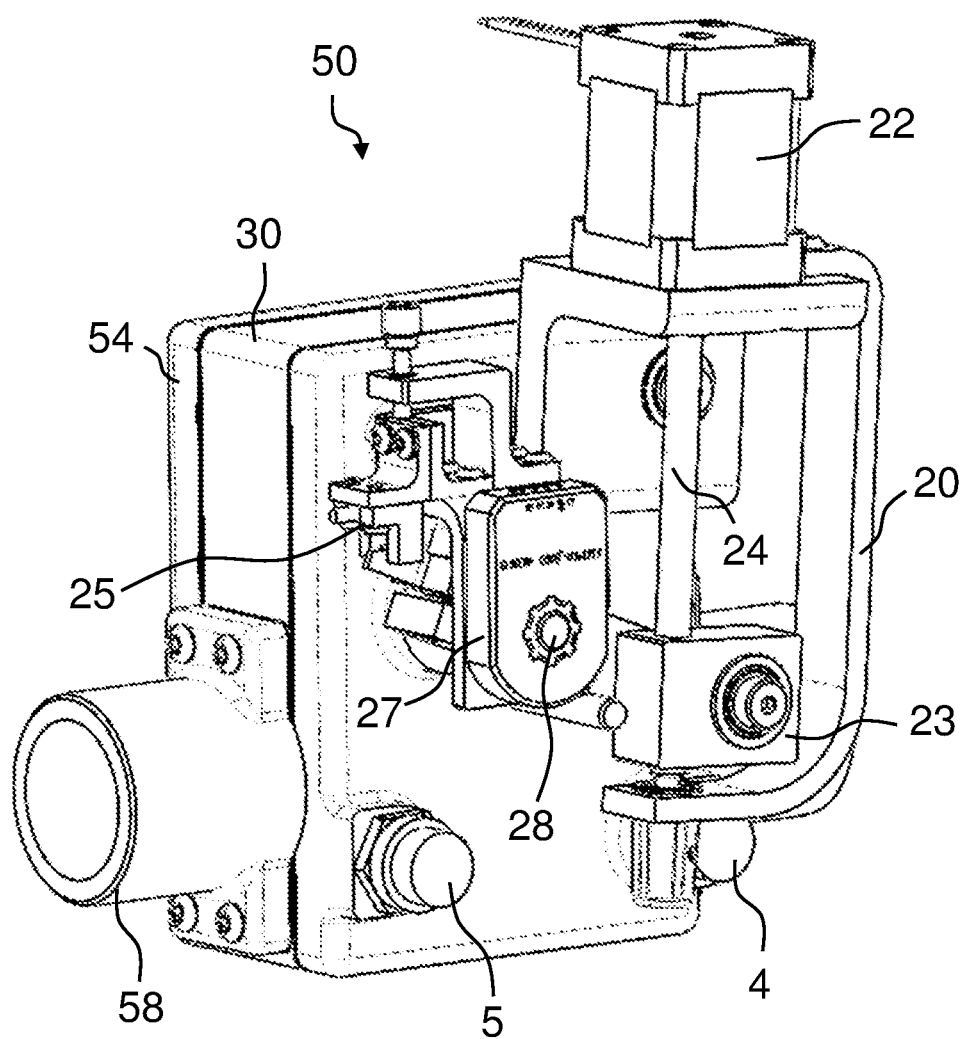
FIG. 4 is a back perspective view of the example valve system of FIG. 3.
Figure 5:
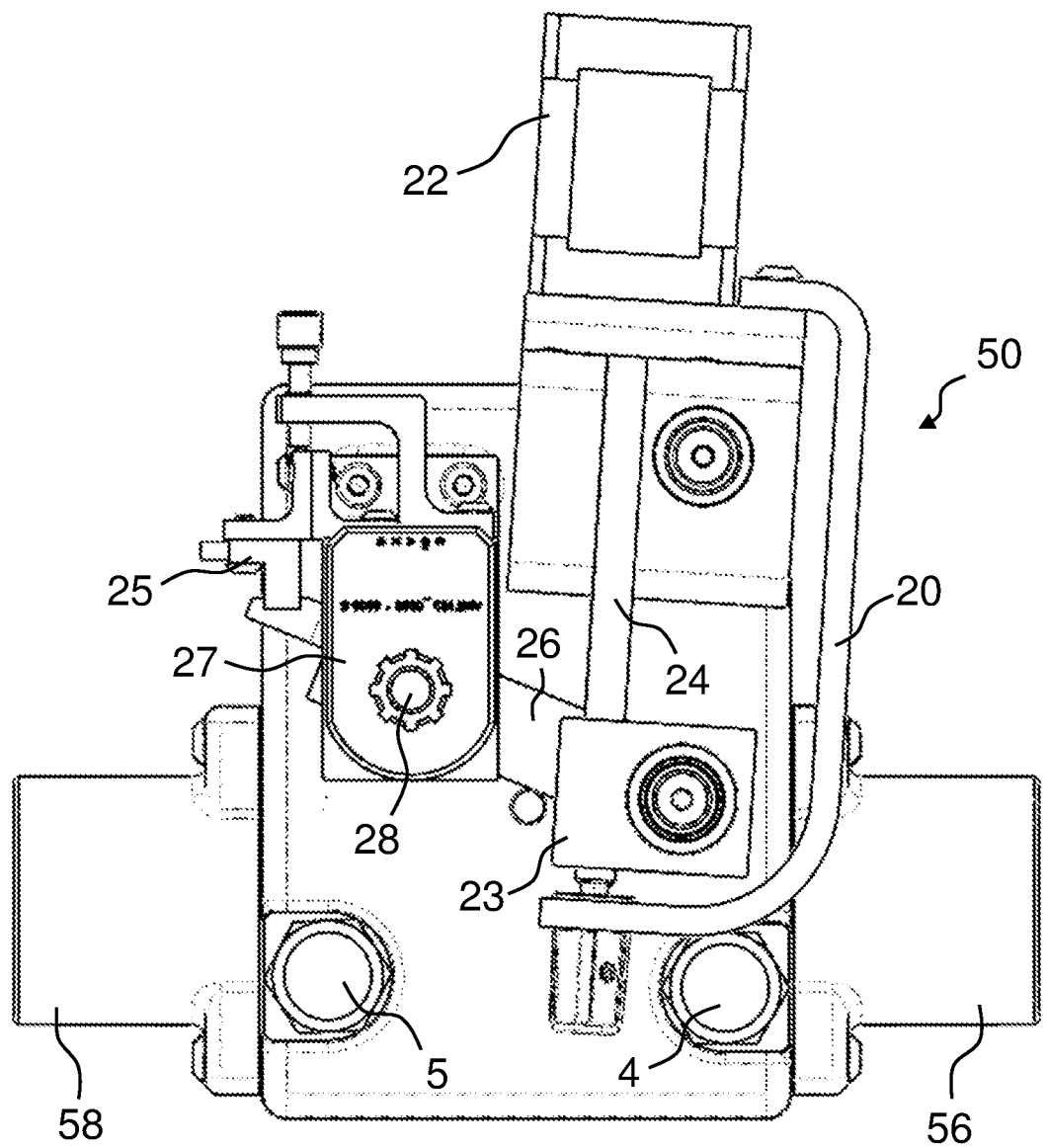
FIG. 5 is a back view of the valve system of FIG. 3.
Figure 6:
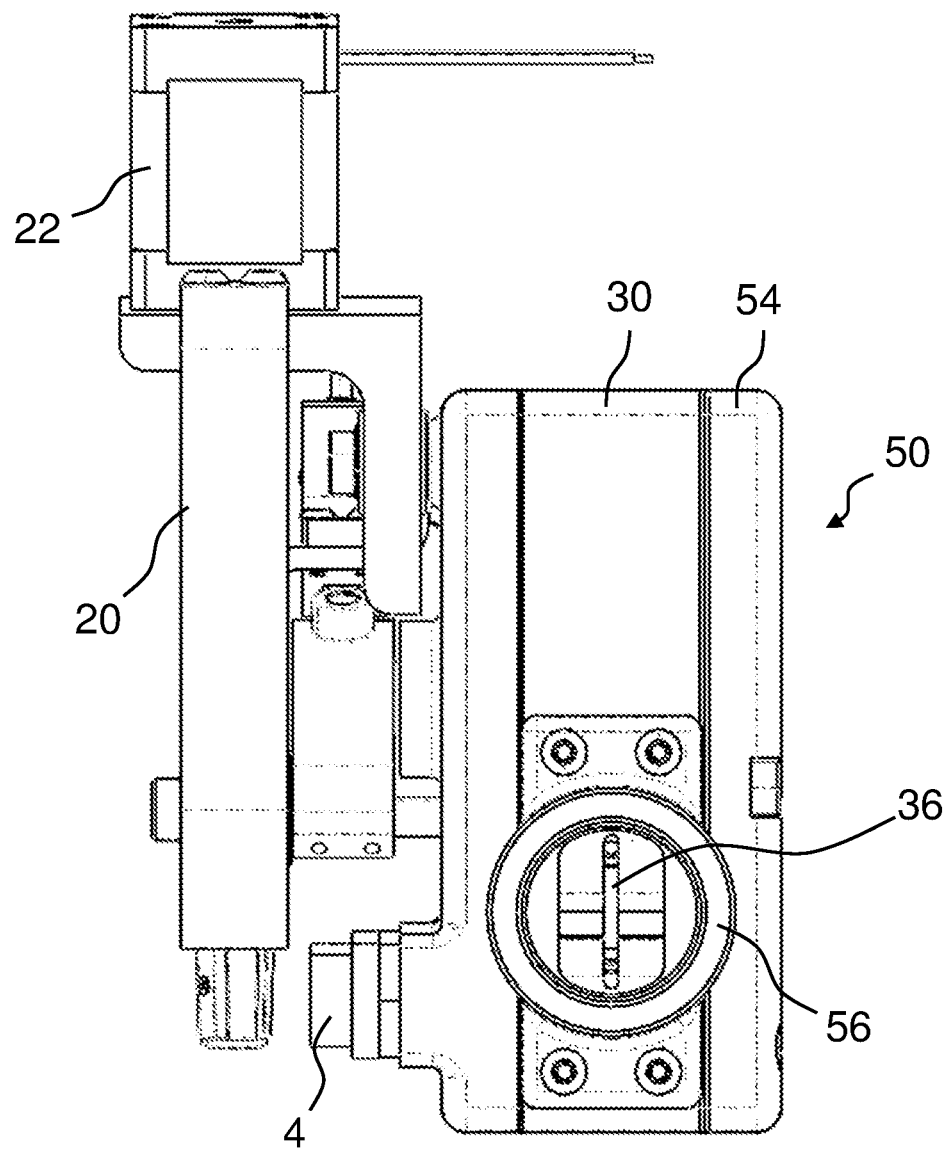
FIG. 6 is a left side view of the example valve system of FIG. 3.
Figure 7:
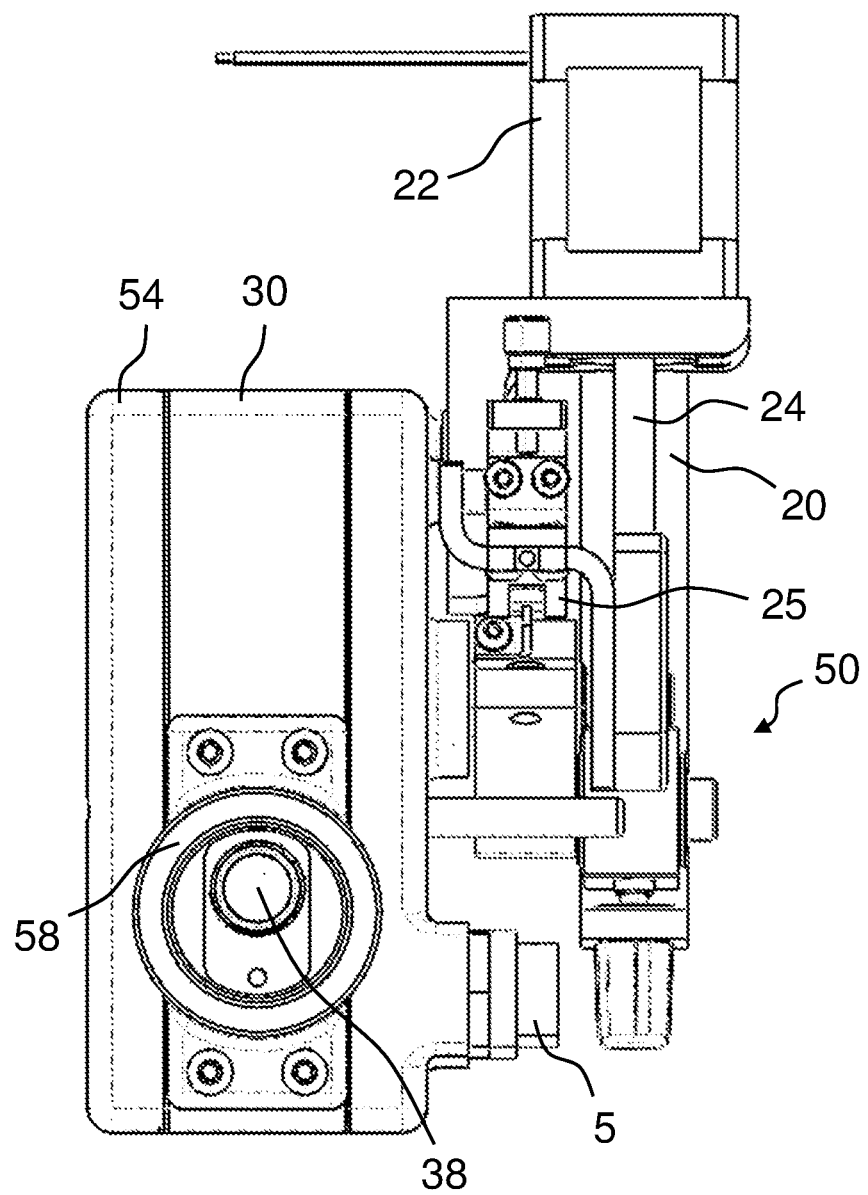
FIG. 7 is a right side view of the example valve system of FIG. 3.
Figure 8:
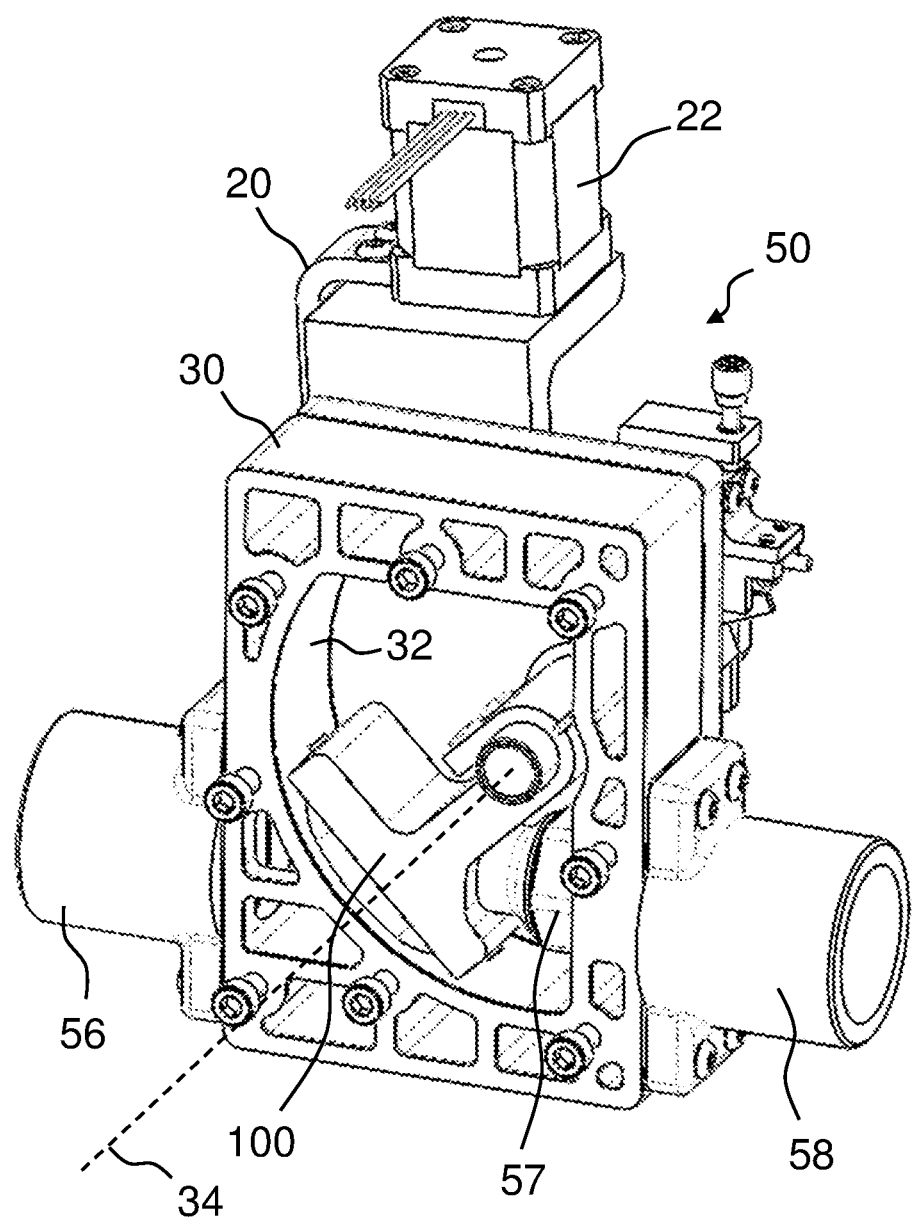
FIG. 8 is a front perspective view of the example valve system of FIG. 3 with the front cover removed to enable viewing of internal components otherwise obscured.

FIG. 3 is a front perspective view of a valve system 50 according to another example embodiment of the present invention. FIG. 4 is a back perspective view of the example valve system 50. FIG. 5 is a back view of the example valve system 50. FIG. 6 is a left side view of the example valve system 50. FIG. 7 is a right side view of the example valve system 50. FIG. 8 is a front perspective view of the example valve system 50 with the front cover removed to enable viewing of internal components otherwise obscured. The example fluid valve system 50 has a housing 30, a front cover 54, a first port 56 and a second port 58, and defines a fluid flow path therebetween. The example valve system 50 optionally includes a first conventional pressure sensor 4 that can sense a fluid pressure corresponding to the fluid pressure at the first port 56, and a second conventional pressure sensor 5 that can sense a fluid pressure corresponding to the fluid pressure at the second port 58. A pivotable valve foot assembly 100 within the housing 30 preferably can selectively interrupt or control the rate of flow through the fluid flow path, as will be described in more detail below.

Now referring to FIGS. 3-8, the example valve system 50 may further include a foot pivoting mechanism 20 that includes a motor 22 that turns a lead screw 24 having a bearing captured distal end. In certain embodiments, the motor 22 may be a stepper motor that is integrated with the lead screw 24 and controlled by a controller. In certain embodiments, the lead screw 24 may move lead screw nut 23 that is attached to a lever 26 that turns a valve foot pivot shaft 28. The valve system 50 may optionally further include a rotary encoder 27 to provide feedback of the rotational position of the valve foot pivot shaft 28 to the controller. The valve system 50 may optionally further include a limit switch 25 that interrupts the operation of the motor 22 as the valve foot pivot shaft 28 reaches a limit of its operational angular range.

Figure 9:
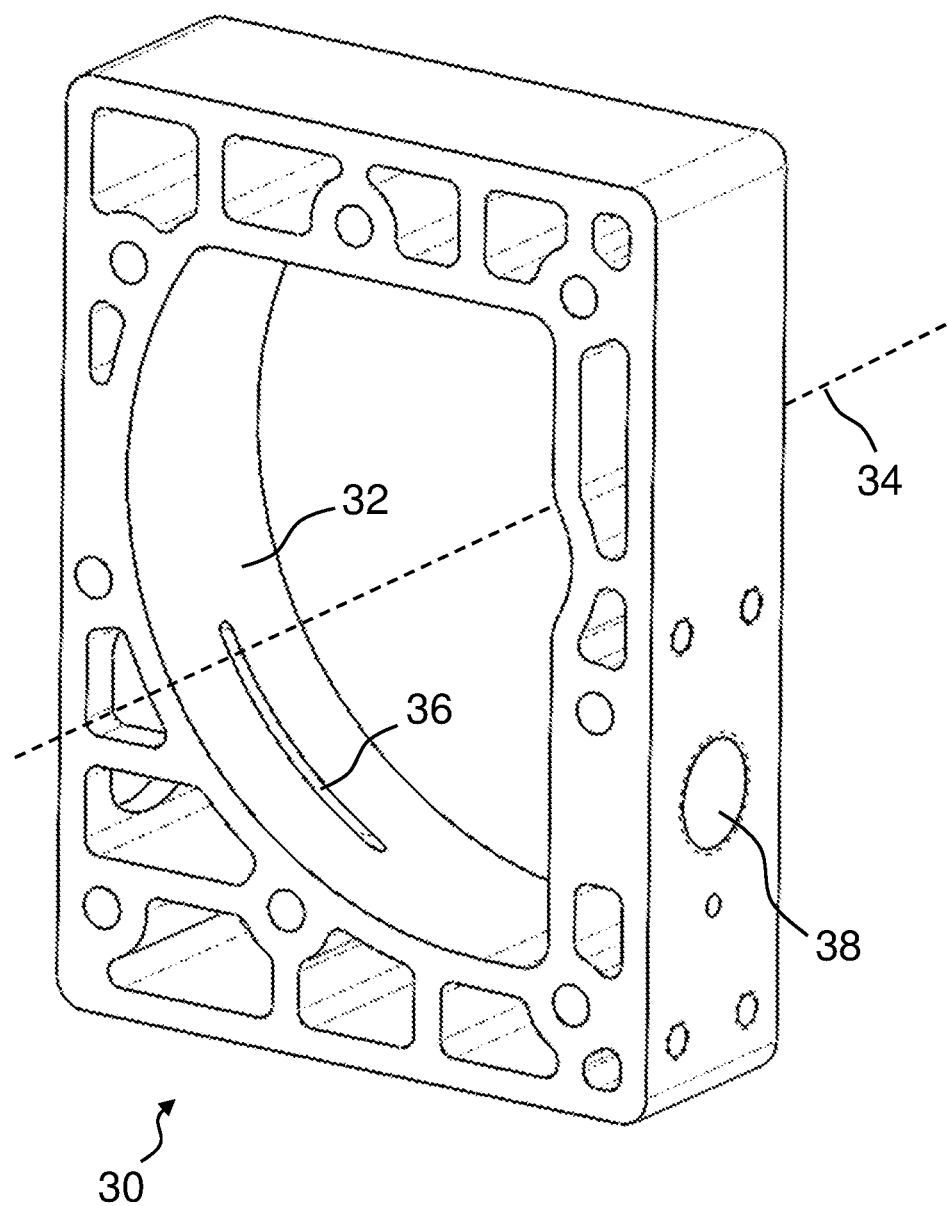
FIG. 9 is a housing of a valve according to an example embodiment of the present invention.
Figure 10:
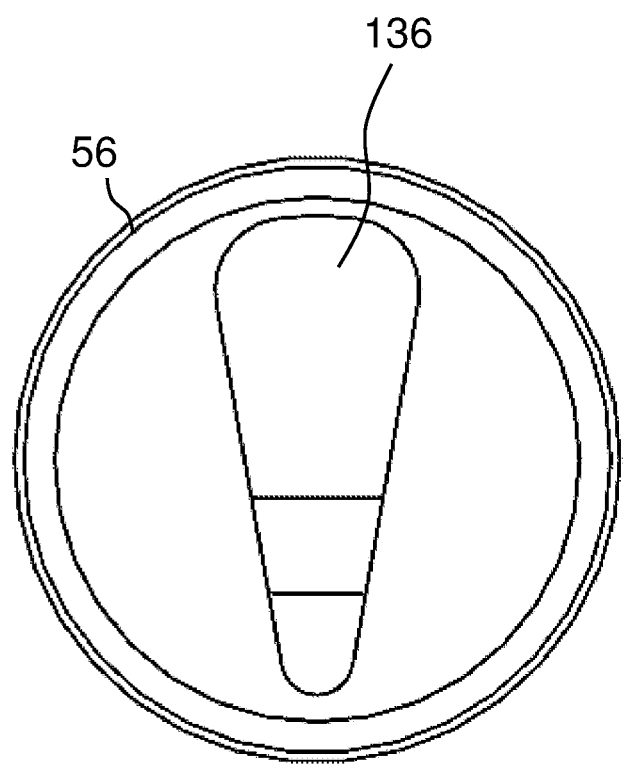
FIG. 10 is a first port view of an opening having a tapered elongate cross-section and extending to the first port from an interior cylindrically-arcuate surface of the valve housing, according to another embodiment of the present invention.

FIG. 9 depicts a housing 30 of the example fluid valve system 50 of the embodiment of FIG. 8. As shown in FIG. 9, the example valve housing 30 includes an interior cylindrically-arcuate surface 32 that defines a center of curvature 34. In this embodiment, the flow path between the first port 56 and a second port 58 passes through a side opening 38 in a right side of the housing 30, and an elongate opening 36 in the interior cylindrically-arcuate surface 32. FIG. 10 depicts an alternative embodiment of an elongate opening 136 in the interior cylindrically-arcuate surface 32, as viewed from and through the first port 56 of FIG. 8. As shown in FIG. 10, the elongate opening 136 has a tapered elongate cross-section and extends to the first port 56 from the interior cylindrically-arcuate surface 32 of the valve housing 30.

The valve housing 30 is considered herein to be an "extruded housing" because it has structural design characteristics that enable it to be substantially fabricated by an extrusion process. One of ordinary skill in the manufacturing arts and sciences would recognize from the structural design of housing 30 shown in FIG. 9 that it can be substantially fabricated by extrusion parallel to an axis of extrusion (shown in FIG. 9 as being a dashed line coincident with the center of curvature 34) because the shape and dimensions of most of its defining features remain constant at varying positions along the axis of extrusion. Although some subsequent machining steps may also be taken to create or refine some other features (e.g., features oriented transverse to the axis of extrusion like the elongate opening 36 and the side opening 38 that do not run parallel to the depicted extrusion axis), still the housing 30 is considered in the present context to be an extruded housing because one of ordinary skill in the art would recognize that the majority of its structural geometry can be fabricated by extrusion parallel to the depicted extrusion axis. Moreover, one of ordinary skill in the mechanical and manufacturing arts and sciences will recognize considerable manufacturability, cost, and performance advantages to the structural design of the housing 30 that are not achieved by conventional valve housings that do not lend themselves to fabrication by extrusion.

Figure 11A:
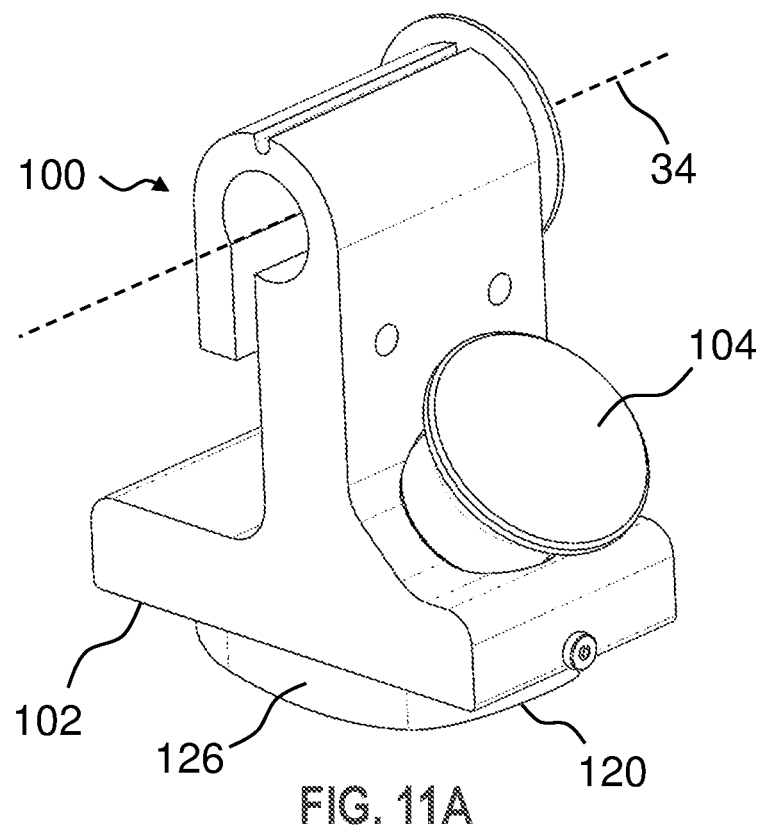
FIGS. 11A and 11B are perspective views of a valve foot assembly according to an example embodiment of the present invention.
Figure 11B:
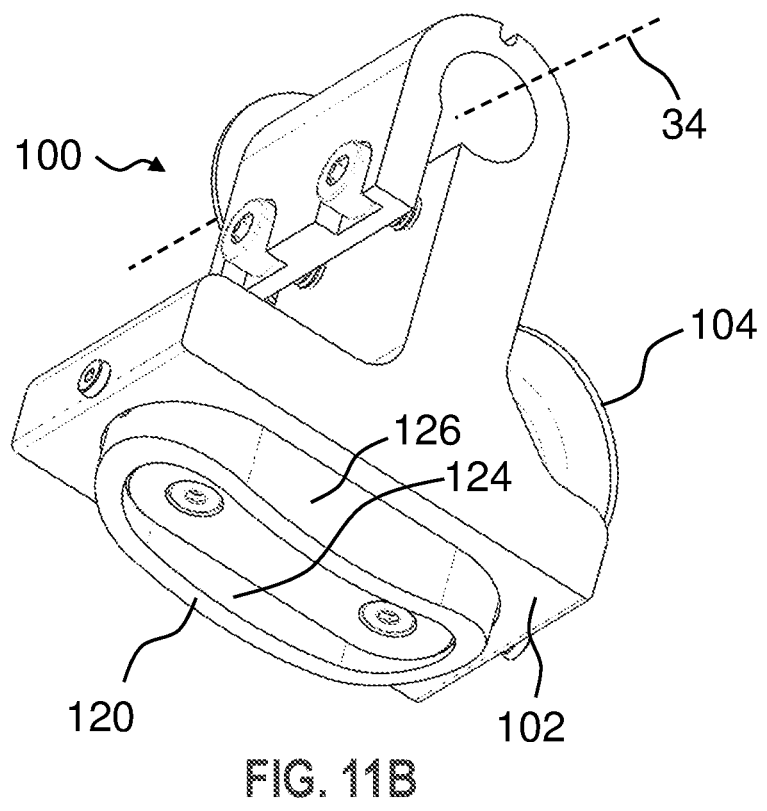
Figure 12A:
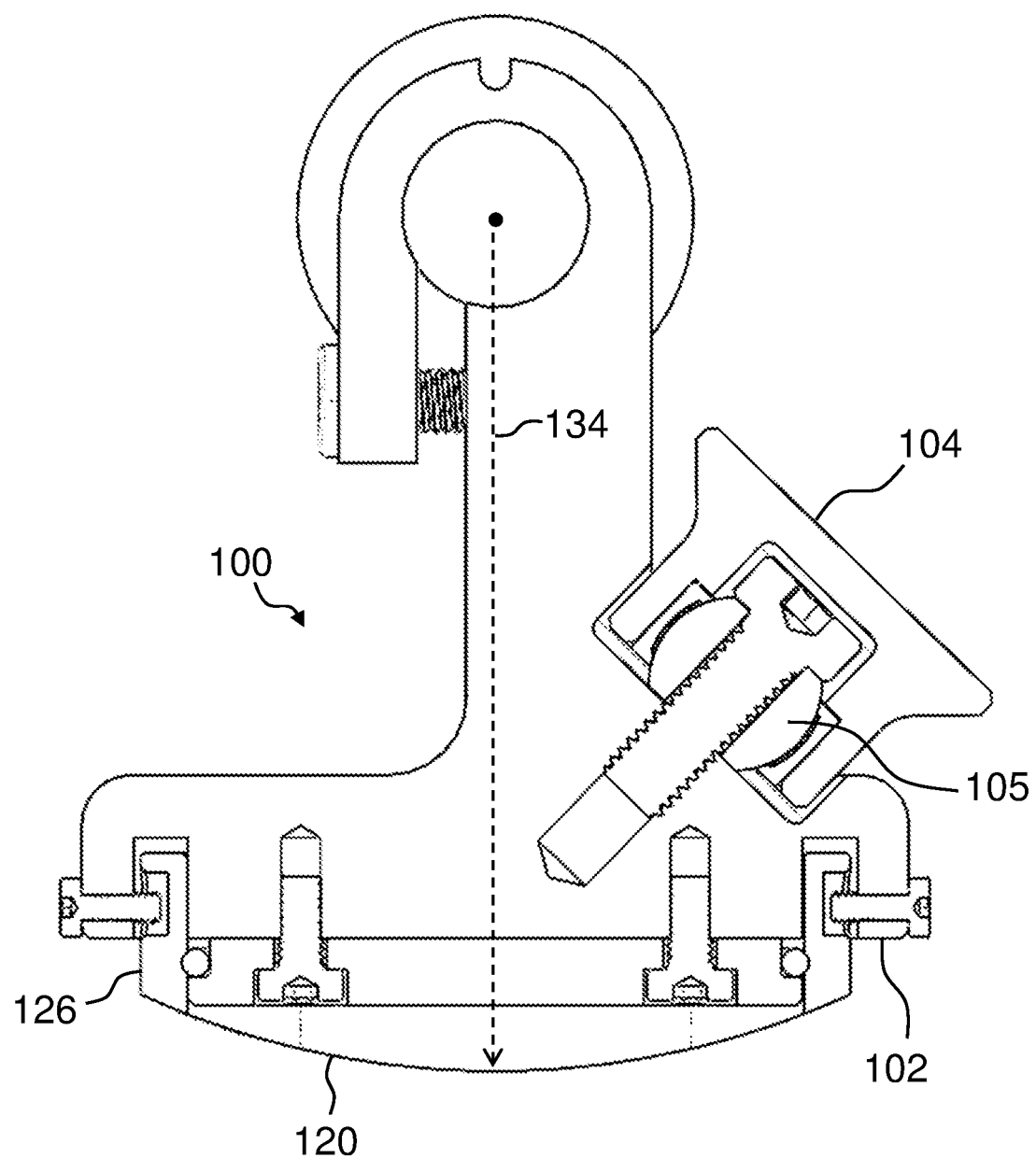
FIG. 12A is a cross-sectional view of the example valve foot assembly of FIGS. 10A and 10B.

FIGS. 11A and 11B are perspective views of the valve foot assembly 100 of the example embodiment of FIG. 8. FIG. 12A is a cross-sectional view of the example valve foot assembly 100. Now referring to FIGS. 8, 9, 11A, 11B, and 12A, the example foot assembly 100 extends in a radial direction 134 away from the center of curvature 34, and pivots within an operational angular range about the center of curvature 34. The example valve foot assembly 100 may have a bottom 102 and a heel 104. The bottom 102 of the valve foot assembly 100 preferably faces the interior cylindrically-arcuate surface 32 of the housing 30 (and away from the center of curvature 34). However, the heel 104 of the foot assembly 100 is shown to be disposed transverse to the bottom 102, even though they are not perpendicular to each other in this embodiment. In this context, the heel 104 of the foot assembly 100 is considered to be disposed transverse to the bottom 102 because the bottom 102 is oriented so that its surface normal is substantially aligned with the radial direction 134, while surface normal of the heel 104 is in a substantially different direction. Perpendicularity is not required.

In the example embodiment of FIGS. 8, 9, and 11A-12A, the bottom 102 of the example foot assembly 100 may include a shoe 120, and is preferably configured to translate over the elongate opening 36 in the interior cylindrically-arcuate surface 32. The heel 104 of the example foot assembly 100 is preferably configured to abut an internal seating or sealing component 57 of the second port 58, with the foot assembly 100 pivoted to a closed position of its operational angular In certain embodiments, the heel 104 is preferably configured so that it can pivot relative to the foot assembly 100 to align flatly to the internal seating or sealing component 57 of the second port 58 for improved sealing. The ball component 105 shown in FIG. 12A is an optional structural feature that can so configure the heal 104.

Figure 14:
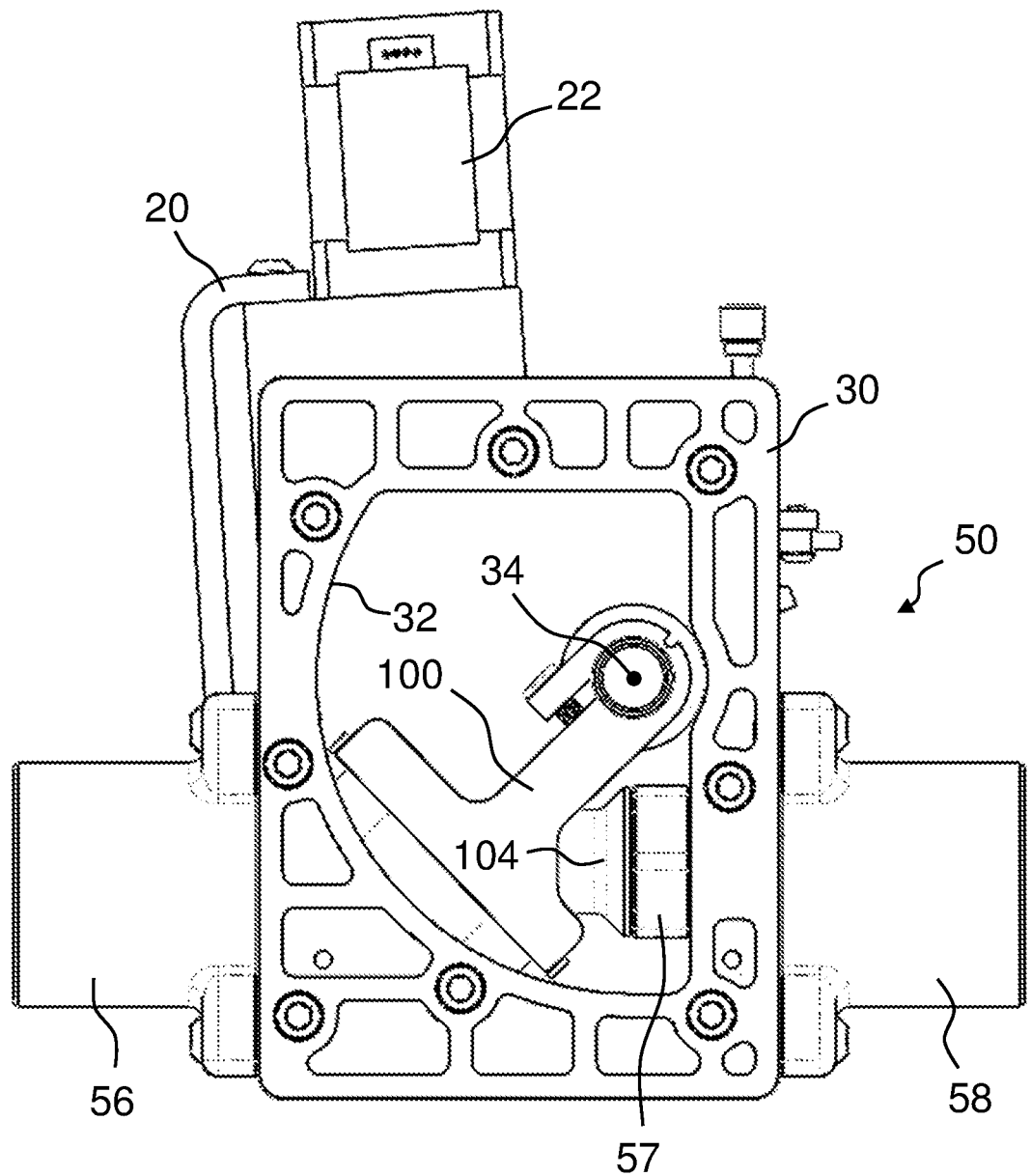
FIG. 14 is a front view of the uncovered valve system of FIG. 8, with the valve foot pivoted to a closed position.

FIG. 14 is a front view of the valve system 50 with the foot assembly 100 pivoted counter-clockwise to a closed position. As shown in FIGS. 8 and 14, the closed position of the operational angular range optionally may correspond to reaching or nearing a counter-clockwise limit of the operational angular range, although it is contemplated that the configuration could be reversed so that the clockwise rotation would close the valve.

In the embodiment of FIGS. 8, 9, 11A-12A, and 14, the interior cylindrically-arcuate surface 32 defines a circumferential direction orthogonal to the radial direction 134, and the elongate opening 36 is preferably elongate in that circumferential direction. The elongate opening 36 is also preferably sized and positioned so that an area of overlap by the shoe 120 of the bottom 102 of the foot assembly 100 over the elongate opening 36 decreases as the foot assembly 100 pivots clockwise away from the closed position (the position of the foot assembly 100 shown in FIGS. 8 and 14). In that way, the angular position of the foot assembly 100 can control the flow rate through the valve system 50, with decreasing overlap by the shoe 120 of the bottom 102 of the foot assembly 100 over the elongate opening 36 corresponding to increasing flow rate, and increasing overlap by the shoe 120 of the bottom 102 of the foot assembly 100 over the elongate opening 36 corresponding to decreasing flow rate.

In an alternative example embodiment of the present invention, the elongate opening in the interior cylindrically-arcuate surface 32 may have a varying width measured orthogonal to both the circumferential direction and to the radial direction 134, so that the area of overlap by the shoe 120 of the bottom 102 of the foot assembly 100 over the elongate opening decreases non-linearly as the foot assembly 100 pivots clockwise away from the closed position. For example, the shape of the elongate opening through the interior cylindrically-arcuate surface 32 optionally may taper linearly as shown FIG. 10, although openings with non-linear taper are also contemplated herein. In such embodiments, the varying width of the elongate opening through the interior cylindrically-arcuate surface 32 may allow increase or decrease in flow rate with angular movement of the foot assembly 100 to be advantageously tailored for a desired application.

Figure 15:
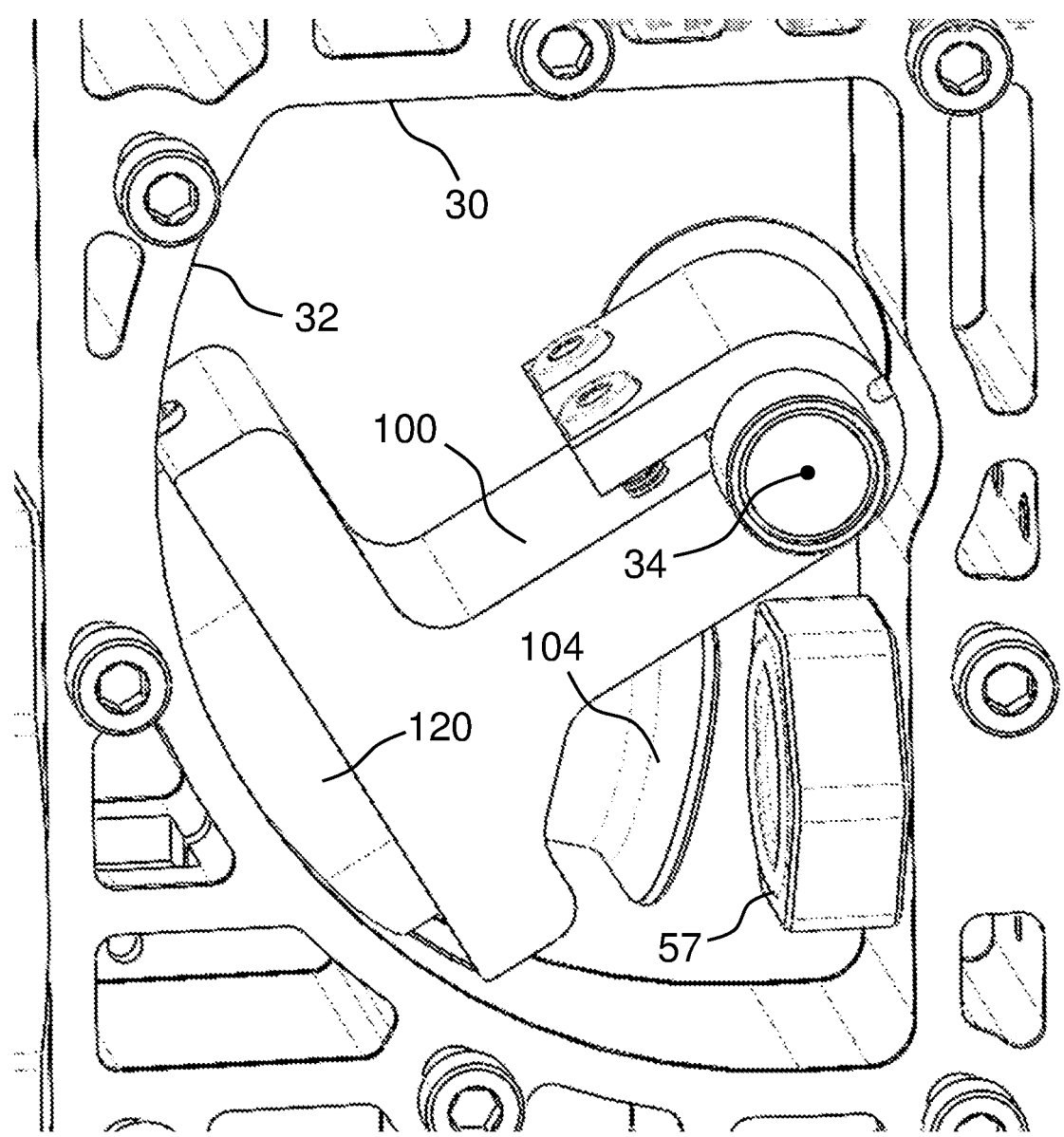
FIG. 15 is a front perspective view of the uncovered valve system of FIG. 8, with the valve foot pivoted to a partially open position.

FIG. 15 is a front perspective view the valve system 50 with the valve foot assembly 100 pivoted to a partially open position. In the partially open position of FIG. 15, the valve system 50 of FIGS. 9, and 11A-12A allows a desired rate of flow through the side opening 38 of the housing 30 and through a portion of the elongate opening 36 in the interior cylindrically-arcuate surface 32 that is not overlapped by the shoe 120 of the bottom 102 of the foot assembly 100. At paddle positions where the heel 104 is not abutting the internal seating or sealing component 57 of the second port 58, the net fluid pressure on the foot assembly 100 acts predominantly in the radial direction 134, so that not much applied torque is needed to rotate the foot assembly 100 (e.g., enough to overcome seal and mechanism friction). In certain embodiments, the area of overlap by the shoe 120 of the bottom 102 of the foot assembly 100 over the elongate opening 36 could optionally (but not necessarily) decrease to zero in a fully open position where the foot assembly 100 is rotated towards or to a clockwise limit of its operational angular range.

In the embodiment of FIGS. 8, 9, 11A-12A, 14, and 15, decreases in the overlap by the shoe 120 of the bottom 102 of the foot assembly 100 over the elongate opening 36 do not need to begin immediately as the foot assembly 100 is pivoted away from the counter-clockwise limit of the operational angular range. Rather it is contemplated that there may be an initial angular movement of the foot assembly 100 away from the counter-clockwise limit where the shoe 120 of the bottom 102 of the foot assembly 100 has not yet uncovered any of the elongate opening 36, but where the heel 104 has departed from abutting the internal seating or sealing component 57 of the second port 58. Within that initial angular movement, the fluid flow is no longer doubly prevented by the heel 104 but is still substantially prevented by the overlap of the shoe 120 of the bottom 102 of the foot assembly 100 over the elongate opening 36.

By contrast, in the fully closed position of the operational angular range of the foot assembly 100, as shown in FIGS. 8 and 14, the valve 50 is in a closed state in which fluid flow through the fluid flow path is preferably prevented by complete overlap of the shoe 120 over the elongate opening 36 and also by the heel 104 abutting the internal seating or sealing component 57 of the second port 58.

Figure 12B:
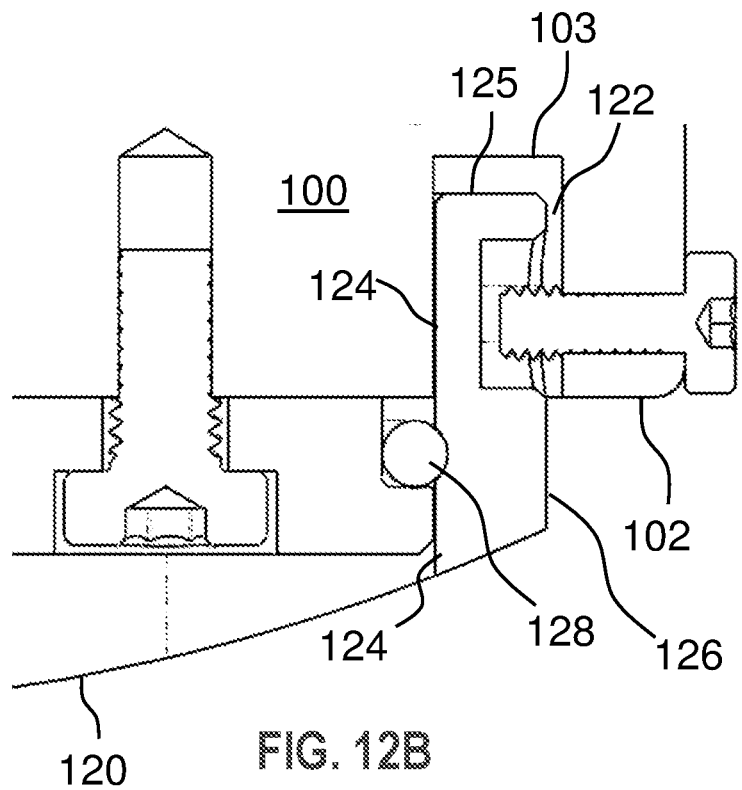
FIG. 12B is a close-up of a region of the cross-section of FIG. 12A, in which an optionally round cross-section of the peripheral seal is more easily visible.

FIG. 12B is a close-up of a region of FIG. 12A's cross-section of the valve foot assembly 100. Referring now to FIGS. 11A through 12B, the shoe 120 preferably compliantly extends radially outwards (in the direction of dashed arrow 134) from the bottom 102 of the foot assembly 100. For example, in certain embodiments, the shoe 120 may include an inward-facing peripheral surface 124 and an outer peripheral surface 126, and the foot assembly 100 may include a shoe receiving groove 103 into which the shoe 120 partially protrudes. In certain embodiments, the shoe 120 may include a foot interface surface (e.g., the inward-facing peripheral surface 124 or the outer peripheral surface 126) that is oriented to be in sliding contact with a mating surface within the shoe receiving groove 103 (or with another guiding surface of the foot assembly 100) to permit and guide relative motion of the shoe 120 (relative to the rest of the foot assembly 100) in the radial direction 134, and to constrain relative motion of the shoe 120 (relative to the rest of the foot assembly 100) in other directions.

Referring now to FIGS. 8, 9, and 11A through 12B, in certain embodiments the shoe 120 is preferably preloaded to bear against the interior cylindrically-arcuate surface 32 of the housing 30, for example by a plurality of springs that urge the shoe 120 in the radial direction 134. Hence, the shoe 120 may bear against and slide circumferentially relative to the interior cylindrically-arcuate surface 32, as the foot assembly 100 pivots about the center of curvature 34.

In certain embodiments, a gap 122 between the shoe 120 and an inner wall of the groove 103 may allow a fluid pressure difference (between the first and second ports 56, 58) to act upon an upper surface 125 of the shoe 120, thereby further urging the shoe 120 to bear against the interior cylindrically-arcuate surface 32 of the housing 30, for example, when the foot assembly 100 is in partially open angular positions. In certain embodiments, such further urging can enhance sealing between the shoe 120 and the interior cylindrically-arcuate surface 32 during operation of the valve system 50.

Figure 12C:
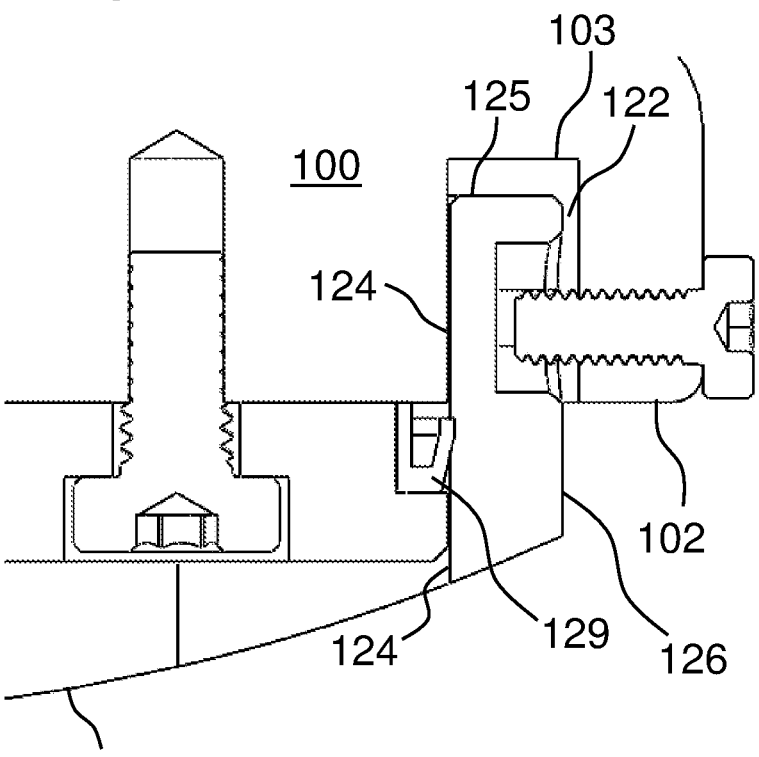
FIG. 12C is a close-up cross-sectional view of a valve foot assembly similar to that of FIG. 12B, except optionally having an alternative peripheral seal with a U-shaped cross-section.
Figure 13A:
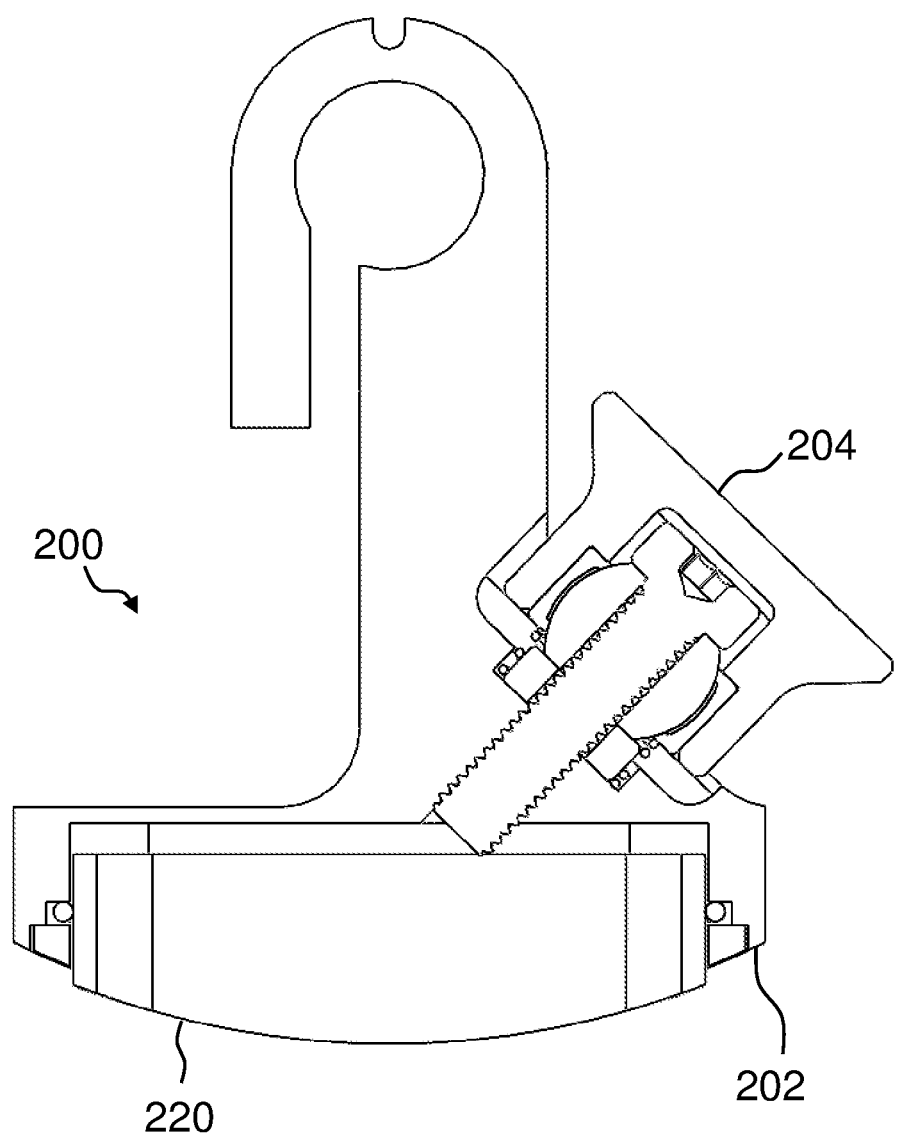
FIG. 13A is a cross-sectional view of a valve foot assembly according to another example embodiment of the present invention.
Figure 13B:
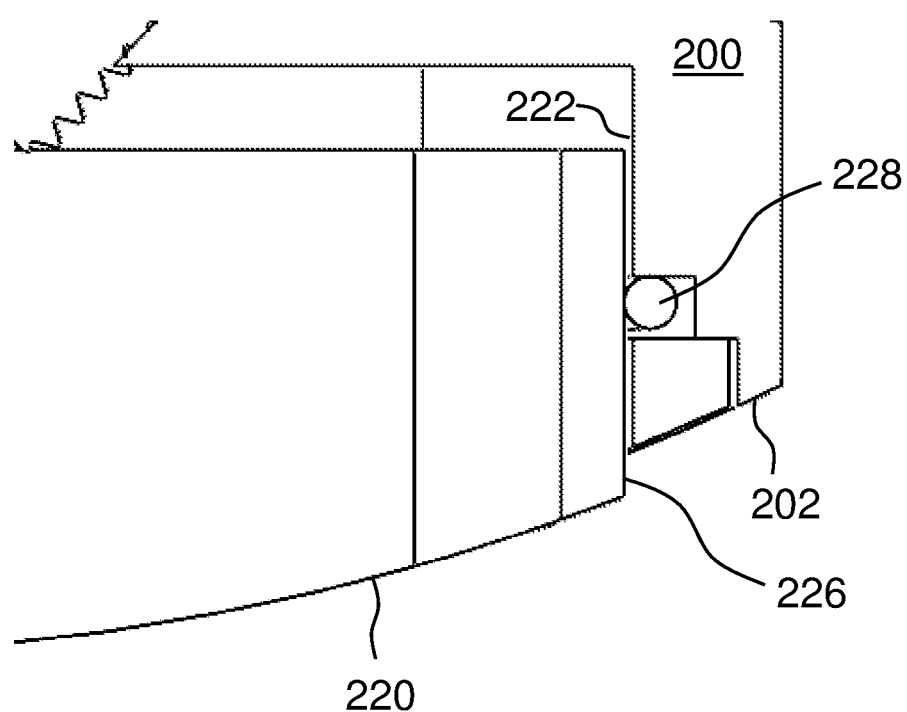
FIG. 13B is a close-up of a region of the cross-section of FIG. 12A.

In certain embodiments, the action of the fluid pressure difference described above to further urge the shoe 120 in the radial direction 134 can be better maintained or better initialized if the valve foot assembly 100 includes a complaint peripheral seal 128 between the foot 120 and an extension of the foot interface surface of the shoe 120. An optionally round cross-section of the peripheral seal 128 is visible in FIGS. 12A-B. FIG. 12C is a close-up cross-sectional view of a valve foot assembly 100 similar to that of FIG. 12B, except optionally having an alternative peripheral seal 129 with a U-shaped cross-section. Even in embodiments where the U-shaped peripheral seal 129 is optionally compressed with less static pressure than the O-ring peripheral seal 128 would be, still the compliance and geometry of the optional U-shaped cross-section may offer improved sealing once its annular cavity becomes internally pressurized by the fluid.

Referring now to FIGS. 8, 9, and 11A through 12C, in certain embodiments the first port 56 is an outlet port and the second port 58 is an inlet port, and the fluid flow path leads from the second port 58 to the first port 56 unless the valve 50 is in the closed state. In certain such embodiments, the foot pivoting mechanism 20 must apply a counter-clockwise torque to the valve foot assembly 100 to abut the heel 104 against the internal seating or sealing component 57 against the higher relative fluid pressure at the second port 58 when the valve system 50 is desired to be in the closed state. The lead screw 24 optionally may be self-locking so that the valve foot assembly 100 would remain in the closed position in the event of a failure of electrical power to the motor 22.

In certain embodiments, the counter-clockwise torque required to achieve the closed state may be advantageously reduced by back pressure once the shoe 120 completely covers the opening 36. For that reason, decreases in the overlap by the shoe 120 of the bottom 102 of the foot assembly 100 over the elongate opening 36 do not begin immediately as the foot assembly 100 is pivoted away from the counter-clockwise limit of the operational angular range in such embodiments. Also, because of the sense of the pressure difference in such embodiments, the inward-facing peripheral surface 124 preferably may be chosen as the foot interface surface of the shoe 120, so that the peripheral seal 128 or 129 seals against the inward-facing peripheral surface 124 (as shown in FIGS. 12A-12C).

Alternatively, and now referring to FIGS. 8, 9, and 13A-13B, the first port 56 may be an inlet port and the second port 58 may be an outlet port, and the fluid flow path may lead from the first port 56 to the second port 58 unless the valve system 50 is in the closed state. In such an alternative embodiment, the foot pivoting mechanism 20 need not apply a counter-clockwise torque to keep the valve system 50 in the closed state, but applies a clockwise torque to a valve foot assembly 200 to pivot heel 204 away from abutment against the internal seating or sealing component 57 when the valve system 50 is opened. Also, because of the sense of the pressure difference in such an alternative embodiment, an outer peripheral surface 226 of a shoe 220 extending from the bottom 202 of the valve foot assembly 200 preferably may be chosen as the foot interface surface of the shoe 220. For example, in the embodiment of FIGS. 13A-13B the shoe 220 is guided by an inner surface 222 of the valve foot assembly 200, and the peripheral seal 228 seals against the outer peripheral surface 226 of the shoe 220.

Figure 16:
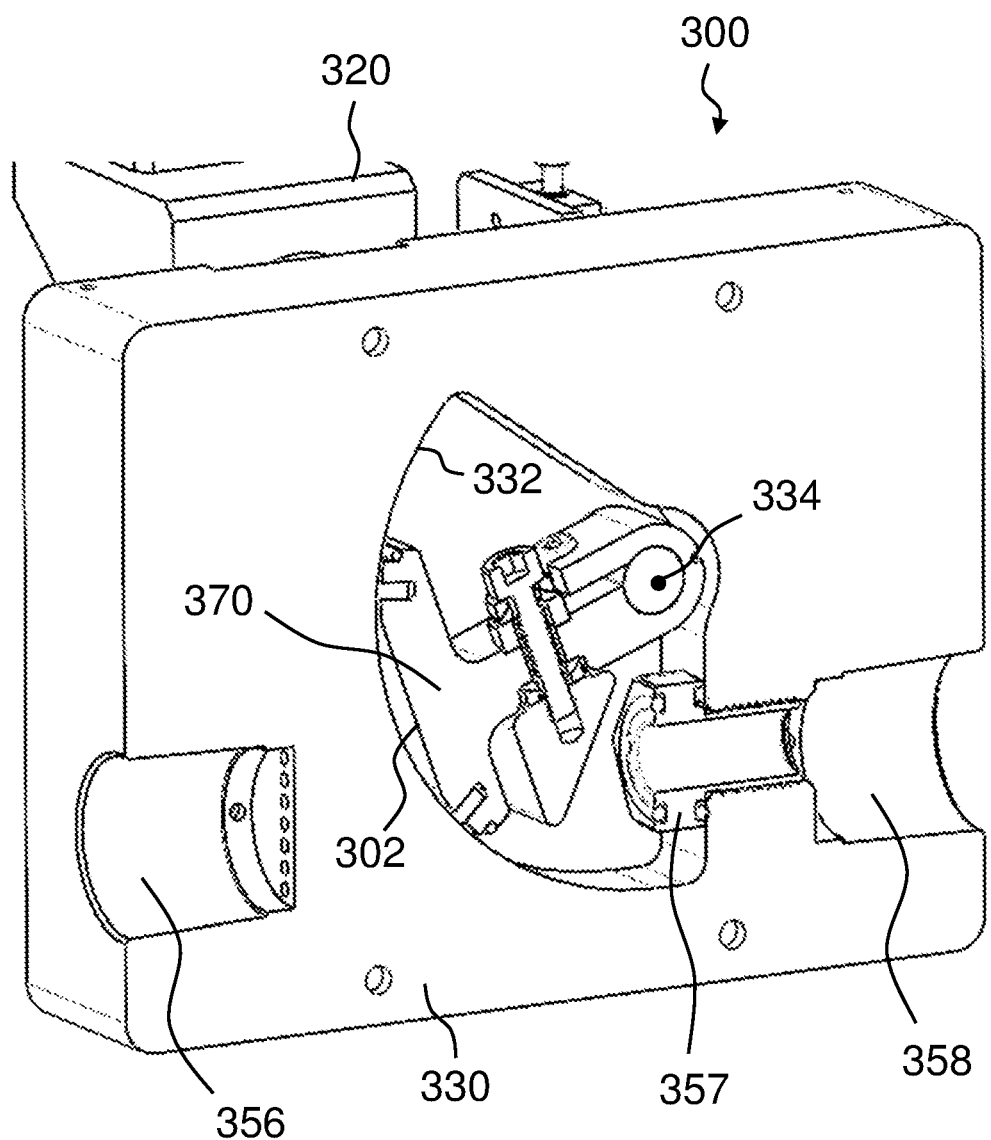
FIG. 16 is a front perspective view of an uncovered valve system of another example embodiment of the present invention, with the valve foot pivoted to a partially open position.
Figure 17:
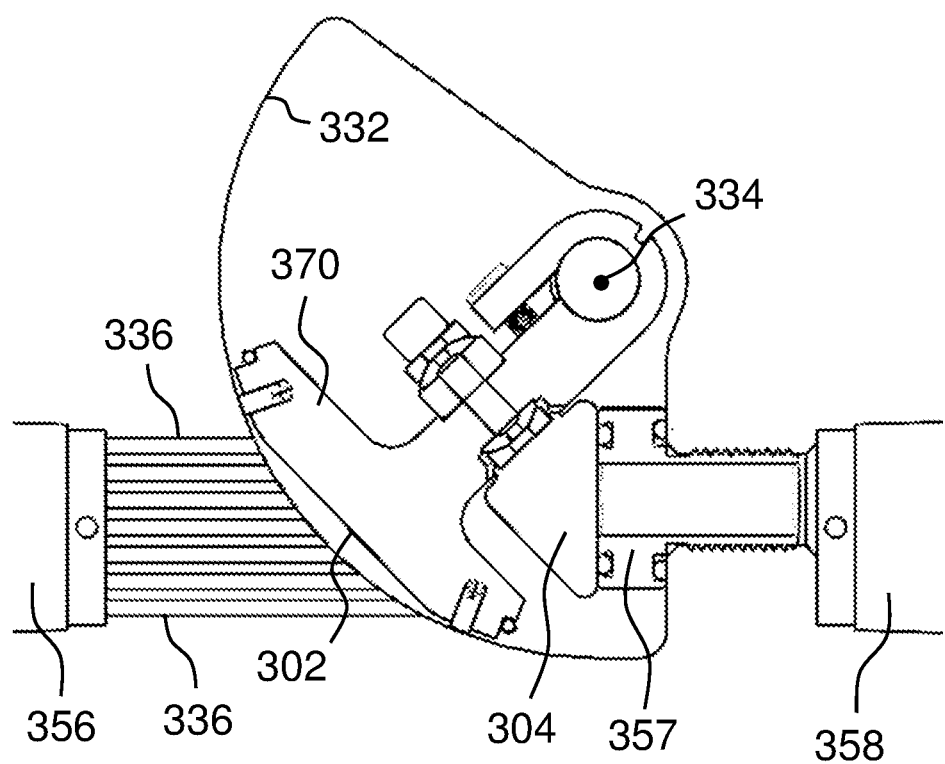
FIG. 17 is a front cross-sectional view of the example valve system of FIG. 16, showing a plurality of openings extending from an interior cylindrically-arcuate surface of the valve housing to a first port.
Figure 18:
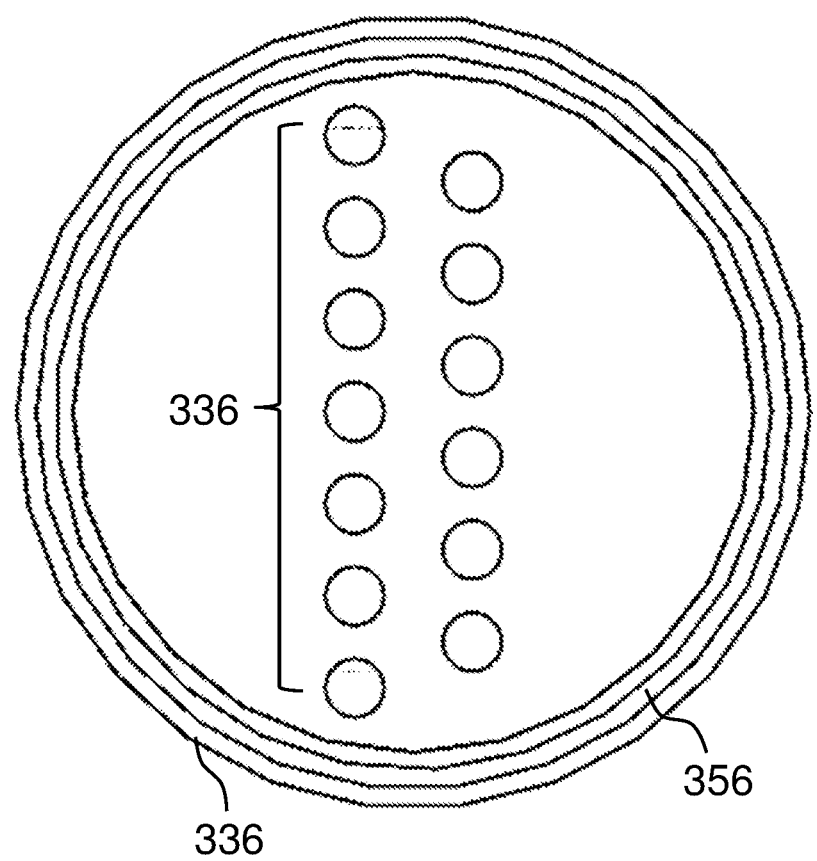
FIG. 18 is a first port view of the plurality of openings of the cross-section of FIG. 17.
Figure 19:
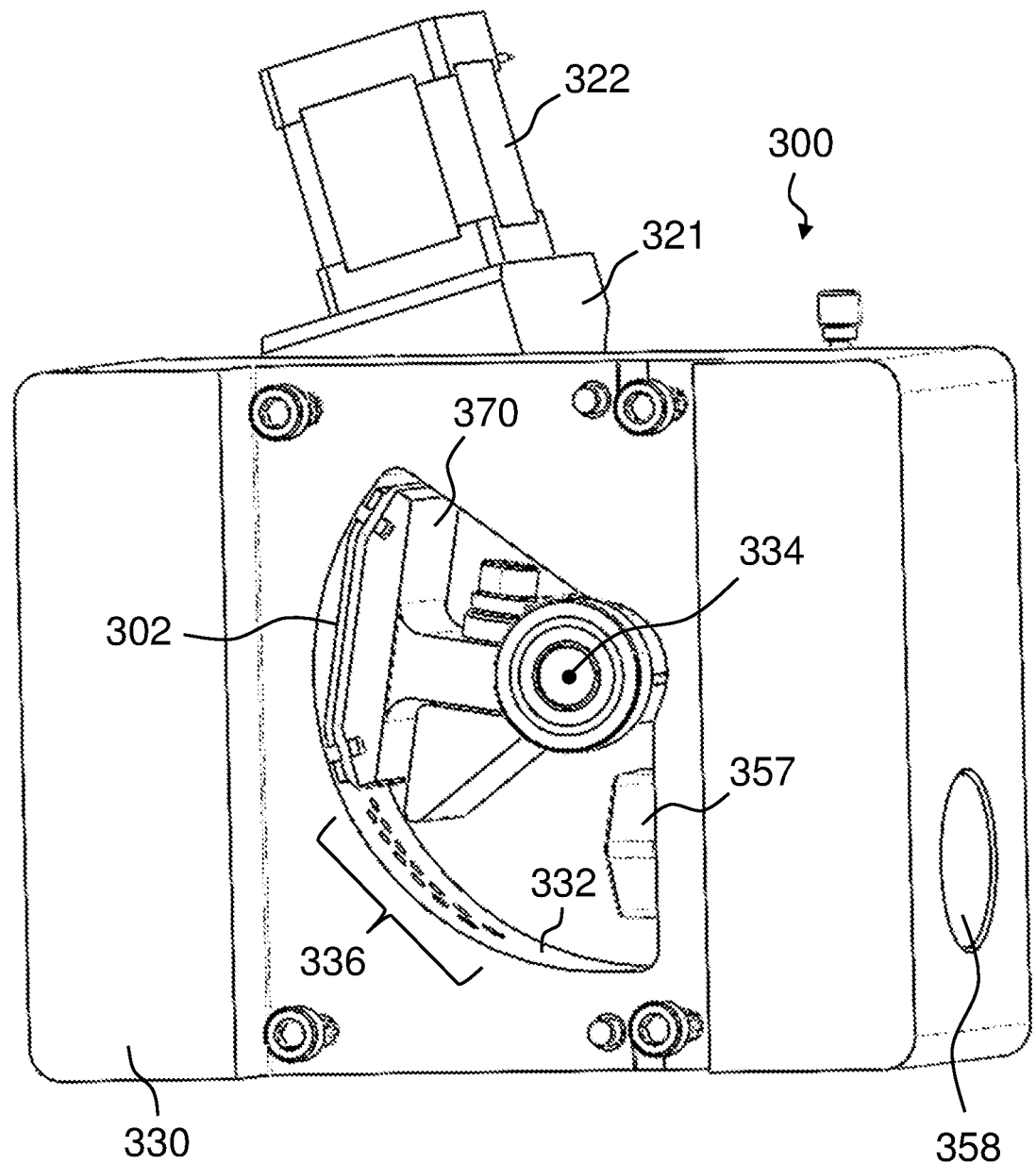
FIG. 19 is a front perspective view of the example valve system of FIG. 15, with the valve foot pivoted to a fully open position.
Figure 20:
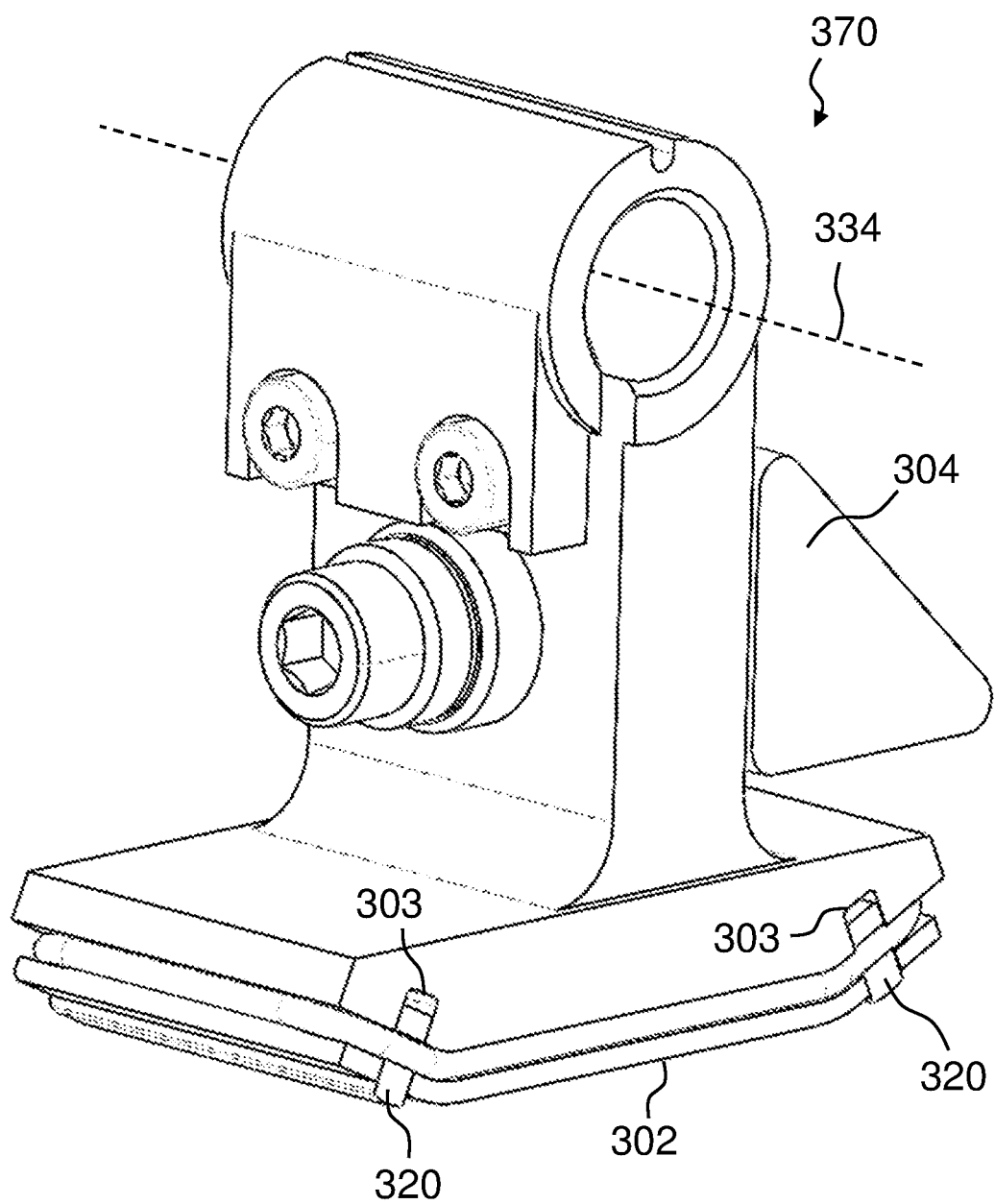
FIG. 20 is a perspective view of the valve foot assembly of the example valve system of FIG. 16.
Figure 21:
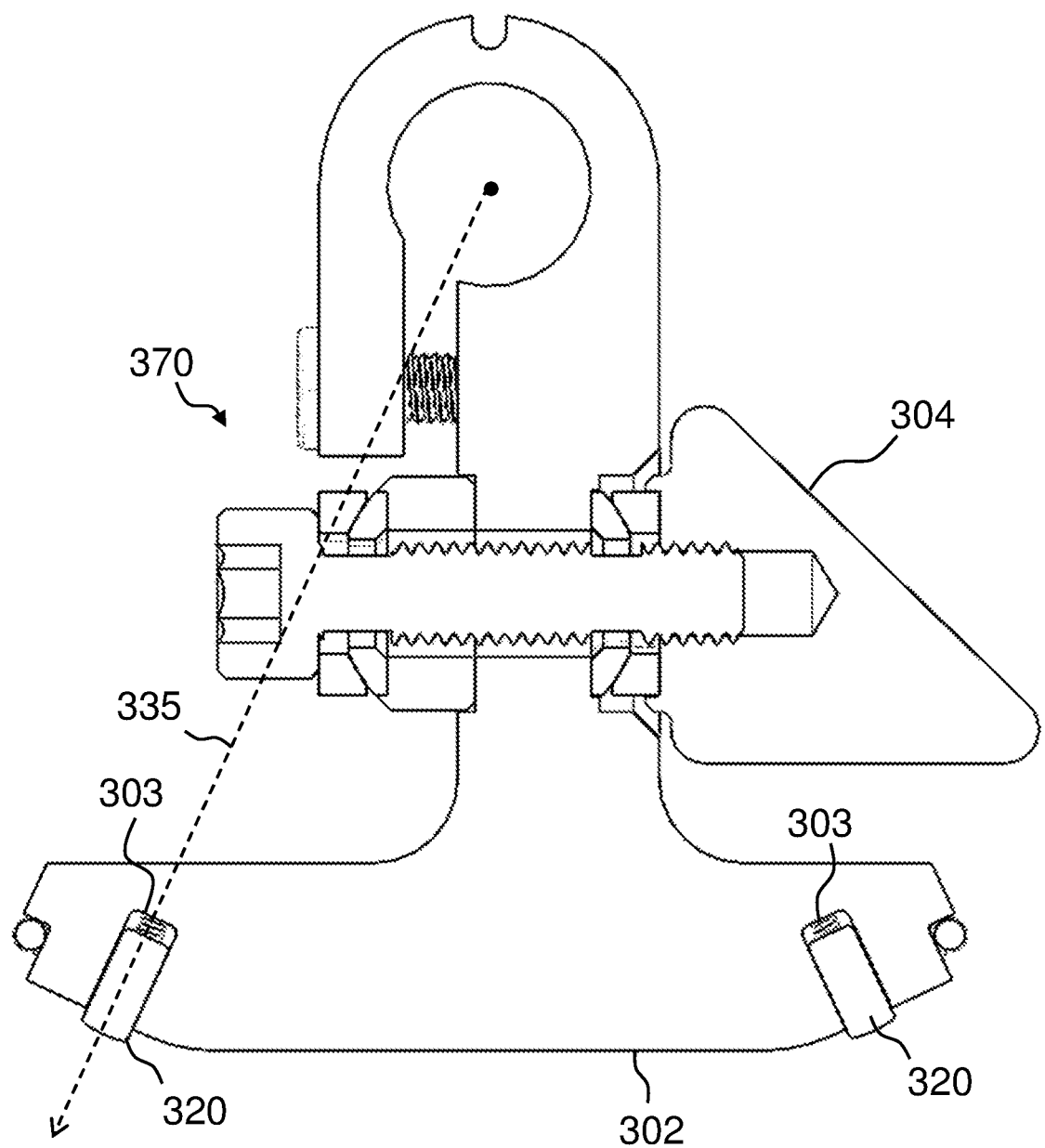
FIG. 21 is a cross-sectional view of the valve foot assembly of FIG. 20.
Figure 22A:
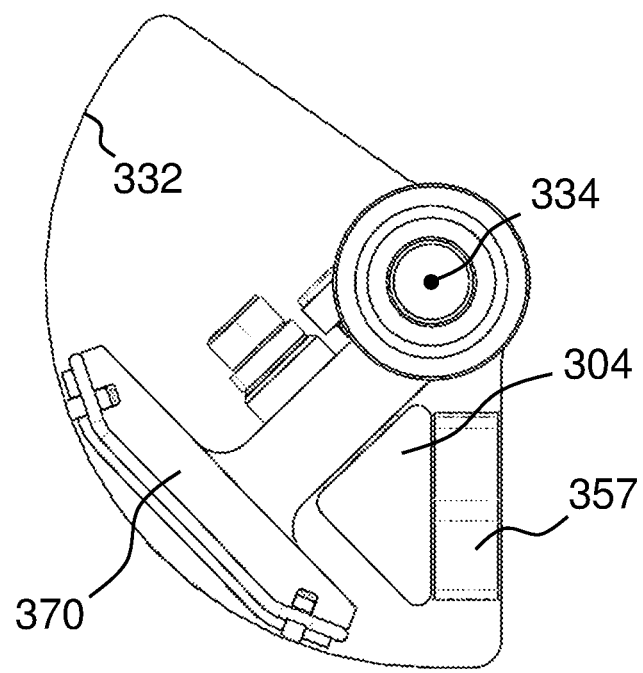
FIG. 22A is a front view of the uncovered example valve system of FIG. 16, with the valve foot pivoted to a fully closed position.
Figure 22B:
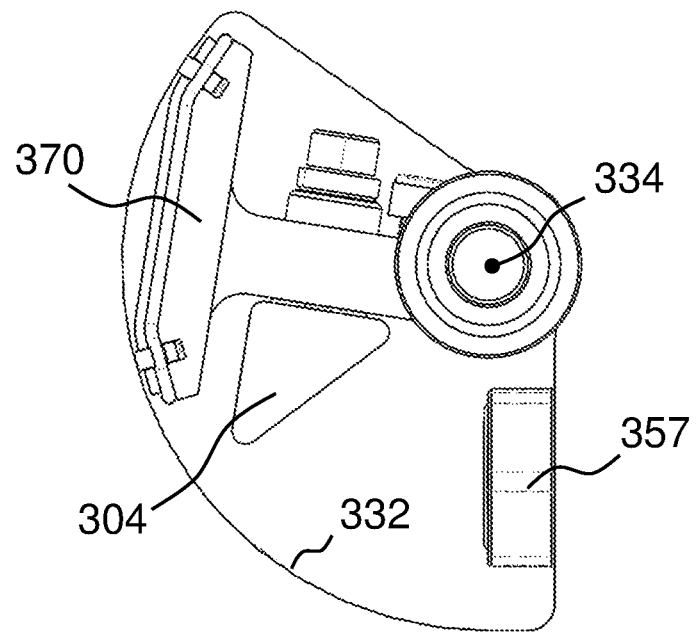
FIG. 22B is a front view of the uncovered example valve system of FIG. 16, with the valve foot pivoted to a fully open position.

FIG. 16 is a front perspective view of an uncovered valve system 300 of another example embodiment of the present invention, having a valve foot assembly 370 pivoted to a partially open position. FIG. 17 is a front cross-sectional view of the example valve system 300, showing a plurality of openings 336 extending from an interior cylindrically-arcuate surface 332 of the valve housing 330 to a first port 356. FIG. 18 shows the plurality of openings 336 from the viewpoint of the first port 356. FIG. 19 is a front perspective view of the example valve system 300 with the valve foot assembly 370 pivoted to a fully open position. FIG. 20 is a perspective view of the valve foot assembly 370 of the example valve system 300. FIG. 21 is a cross-sectional view of the example valve foot assembly 370. FIG. 22A is a front view of the uncovered example valve system 300, with the valve foot assembly 370 pivoted to a fully closed position. FIG. 22B is a front view of the uncovered example valve system 300, with the valve foot assembly 370 pivoted to a fully open position.

Now referring to FIGS. 16-22B, the example valve system 300 includes a valve housing 330 that includes an interior cylindrically-arcuate surface 332 that defines a center of curvature 334. The valve foot assembly 370 is preferably mounted to pivot about the center of curvature 334, and may be controllably angularly positioned by a foot pivoting mechanism 321 that is driven by an electric motor 322. A bottom 302 of the valve foot assembly 370 preferably faces the interior cylindrically-arcuate surface 332 of the housing 330 (and away from the center of curvature 334). However, a heel 304 of the foot assembly 370 is shown to be disposed transverse to the bottom 302.

In this embodiment, the flow path between a first port 356 and a second port 358 passes through a plurality of openings 336 in the interior cylindrically-arcuate surface 332. As shown in the cross-sectional view of FIG. 17, the plurality of openings 336 extend to the first port 356 from the interior cylindrically-arcuate surface 332 of the valve housing 330. FIG. 18 shows the plurality of openings 336 from the viewpoint of the first port 356. FIG. 16 depicts the valve system 300 with the valve foot assembly 370 pivoted to a partially open position. In the partially open position of FIG. 16, the valve system 300 allows a desired rate of flow through a subset of the plurality of openings 336 in the interior cylindrically-arcuate surface 332 that are not overlapped by the bottom 302 of the foot assembly 370.

By contrast, FIG. 17 shows the example valve system 300 in a fully closed state, in which the foot assembly 370 has been pivoted to a position of its operational angular range where fluid flow through the fluid flow path is prevented by complete overlap of the bottom 302 of the foot assembly 370 over all of the plurality of openings 336, and also by a heel 304 of the foot assembly 370 abutting an internal seating or sealing component 357 of the second port 358. In the example embodiment of FIGS. 16-22B, the closed position of the operational angular range optionally may correspond to reaching or nearing a counter-clockwise limit of the operational angular range, although it is contemplated that the designed configuration could be reversed or mirrored so that the clockwise rotation would close the valve.

In FIG. 19 the example valve system 300 is shown in a fully open state, in which the foot assembly 370 has been pivoted clockwise to a position of its operational angular range where fluid flow through the fluid flow path is permitted through all of the plurality of openings 336, without any overlapped (i.e., blocked or partially blocked) by the bottom 302 of the foot assembly 370, and also where the heel 304 of the foot assembly 370 does not abut the internal seating or sealing component 357 of the second port 358.

In the embodiment of FIGS. 16-22B, the interior cylindrically-arcuate surface 332 defines a circumferential direction orthogonal to the radial direction 335, and the plurality of openings 336 are optionally but preferably spaced along that circumferential direction. That is, the plurality of openings 336 are preferably sized and positioned so that a subset that is overlapped by the bottom 302 of the foot assembly 370 decreases as the foot assembly 370 pivots clockwise away from the closed position (the position of the foot assembly 370 shown in FIG. 17). In that way, the angular position of the foot assembly 370 can control the flow rate through the valve system 300, with decreasing overlap by the bottom 302 of the foot assembly 370 over the plurality of openings 336 corresponding to increasing flow rate, and increasing overlap by the bottom 302 of the foot assembly 300 over the plurality of openings 336 corresponding to decreasing flow rate.

In the embodiment of FIGS. 16-22B, decreases in the overlap by the bottom 302 of the foot assembly 370 over the plurality of openings 336 do not need to begin immediately as the foot assembly 370 is pivoted away from the counter-clockwise limit of the operational angular range. Rather it is contemplated that there may be an initial angular movement of the foot assembly 370 away from the counter-clockwise limit where the bottom 302 of the foot assembly 370 has not yet uncovered any of the openings 336, but where the heel 304 has departed from abutting the internal seating or sealing component 357 of the second port 358. Within that initial angular movement, the fluid flow is no longer doubly prevented by the heel 304 but is still substantially prevented by the overlap of the bottom 302 of the foot assembly 370 over the plurality of openings 336.

Now referring to FIGS. 19-21, the example foot assembly 370 extends in a radial direction away from the center of curvature 334, and pivots about the center of curvature 334. The bottom 302 of the example foot assembly 370 may include two shoes 320 that are preferably configured to translate over the interior cylindrically-arcuate surface 332 and the plurality of openings 336. Each shoe 320 preferably compliantly extends outwards in a radial direction (e.g., in the direction of dashed arrow 335) from a corresponding groove 303 in the bottom 302 of the foot assembly 370. In certain embodiments each shoe 320 may be preloaded radially outwards from the bottom 302 of the foot assembly 370 by one or more springs, for example disposed or partially disposed in the corresponding groove 303 as shown in FIG. 21. The heel 304 of the example foot assembly 370 is preferably configured to abut an internal seating or sealing component 357 of the second port 358, when the foot assembly 370 is pivoted to a closed position of its operational angular range. The operational angular range of the example foot assembly 370 may be defined and bounded between a counter-clockwise limit (as shown in FIG. 22A) and a clockwise limit (as shown in FIG. 22B).

Figure 23:
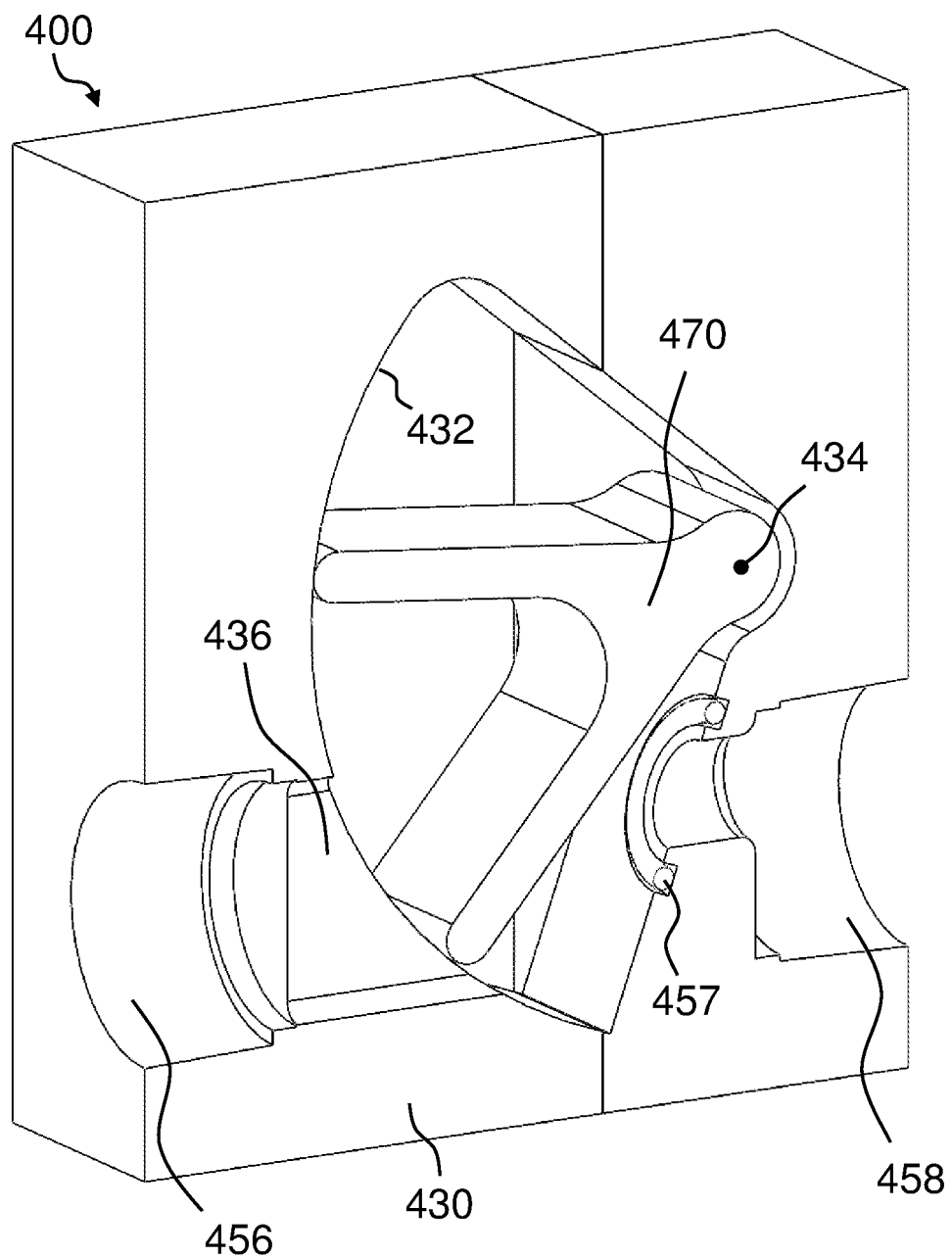
FIG. 23 is a front perspective view of an uncovered valve system of another example embodiment of the present invention, with an arched valve foot pivoted to a partially open position.

FIG. 23 is a front perspective view of an uncovered valve system 400 of another example embodiment of the present invention, with an arched valve foot 470 pivoted to a partially open position. The example valve system 400 includes a valve housing 430 that includes an interior cylindrically-arcuate surface 432 that defines a center of curvature 434. The arched valve foot 470 is preferably mounted to pivot about the center of curvature 434.

A bottom 402, 403 of the arched valve foot 470 preferably faces the interior cylindrically-arcuate surface 432 of the housing 430 but a heel surface 404 of the arched valve foot 470 is shown to be disposed transverse to the bottom 402, 403. The heel surface 404 of the arched valve foot 470 is preferably configured to abut an internal seating or sealing component 457 of the second port 458, with the foot assembly 470 selectively pivoted to a closed position of its operational angular range.

In this example embodiment, a flow path between a first port 456 and a second port 458 passes through an elongate opening 436 in the interior cylindrically-arcuate surface 432. As shown in the cross-sectional view of FIG. 23, the elongate opening 436 extends to the first port 456 from the interior cylindrically-arcuate surface 432 of the valve housing 430. The elongate opening 436 is also preferably sized and positioned so that an area of overlap by the bottom 402, 403 of the arched valve foot 470 over the elongate opening 436 decreases as the arched valve foot 470 pivots clockwise away from the closed position (the position of the arched valve foot 470 in which the heel 404 abuts the internal seating or sealing component 457 of the second port 458. In that way, the angular position of the arched valve foot 470 can control the flow rate through the valve system 400, with decreasing overlap by the bottom 402, 403 of the arched valve foot 470 over the elongate opening 436 corresponding to increasing flow rate, and increasing overlap by the bottom 402, 403 of the arched valve foot 470 over the elongate opening 436 corresponding to decreasing flow rate.

Figure 24:
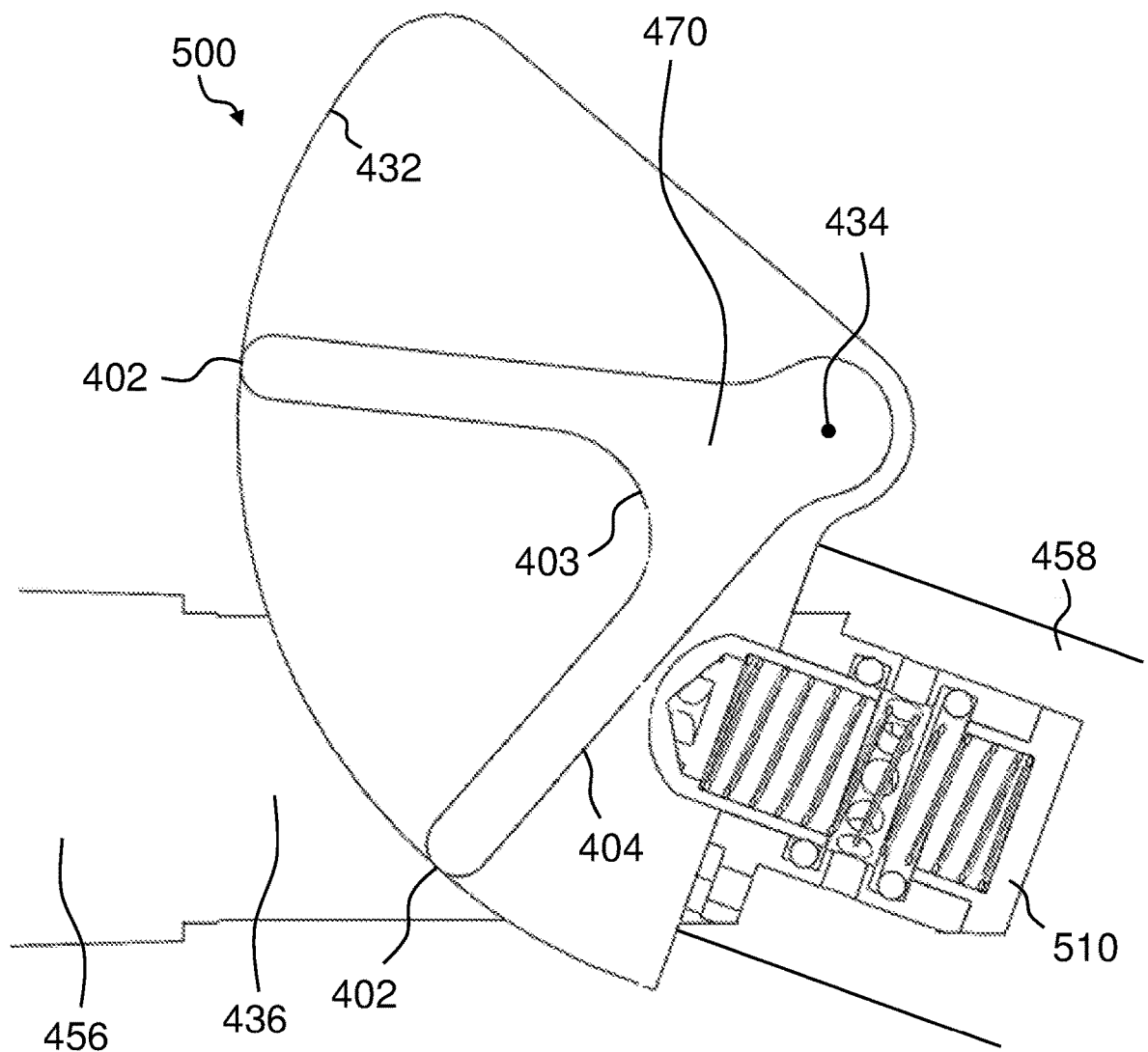
FIG. 24 is a cross-sectional view of an arched valve foot like that of FIG. 23 pivoted to a partially open position, except with a spool valve installed in the second port in place of a simple O-ring seat.

FIG. 24 is a cross-sectional view of a valve system 500 according to another embodiment of the present invention, also including an arched valve foot 470 like that of FIG. 23 pivoted to a partially open position, except with a spool valve 510 installed in the second port 458. In the example embodiments of FIGS. 23 and 24 the second port 458 is preferably but not necessarily the inlet port, although it is contemplated herein that the valve systems 400 and 500 could be used in applications where the second port 458 is instead the outlet port. In certain embodiments, the torque required to pivot the arched valve foot 470 to the fully closed position, against a higher relative fluid inlet pressure at the second port 458 may be advantageously reduced by use of the spool valve 510.

Figure 25A:
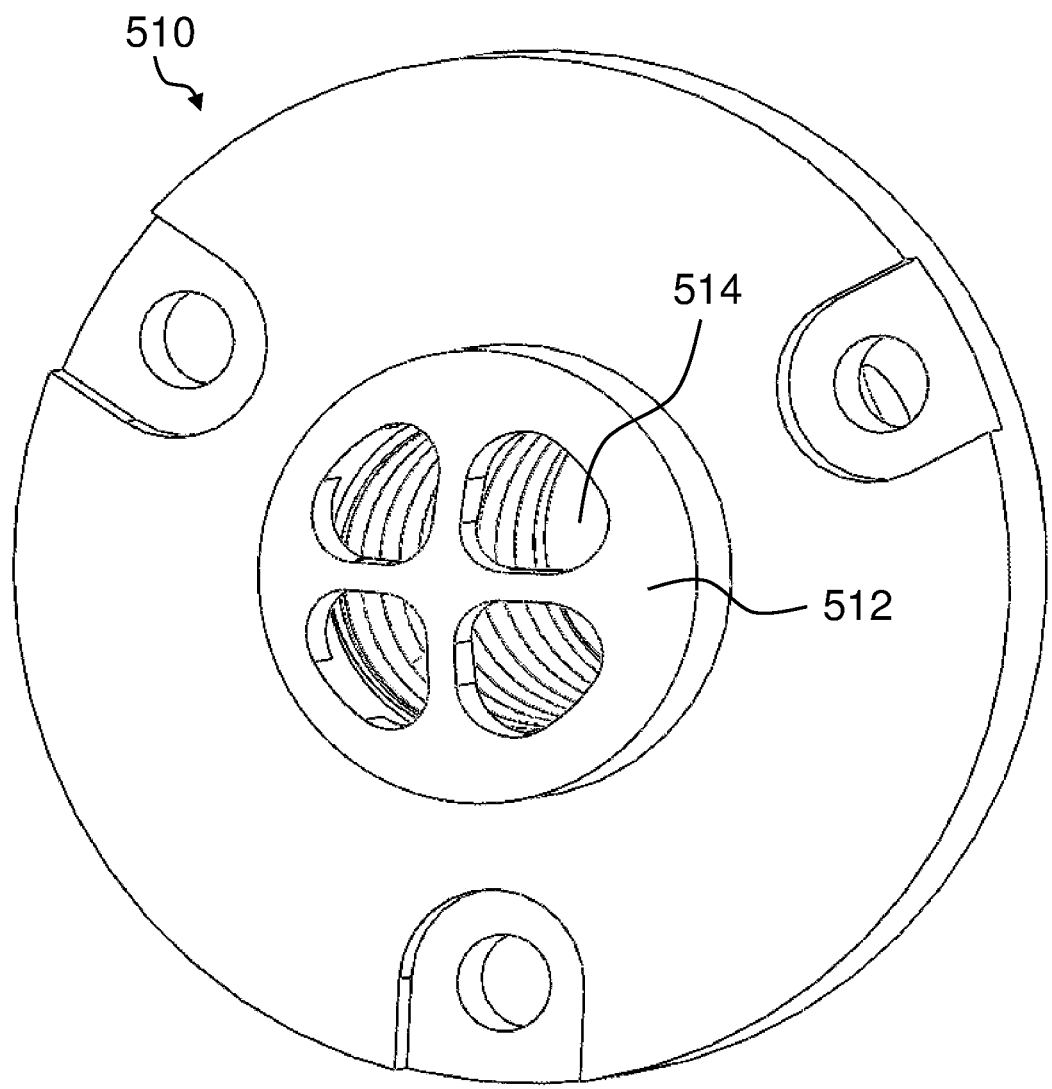
FIG. 25A depicts an end of the spool valve of FIG. 24.

In the example embodiment of FIG. 24, the spool valve 510 protrudes from the second port 458, and the heel surface 404 of the arched valve foot 470 contacts and depresses the otherwise-protruding spool valve 510 as the arched valve foot 470 pivots counter-clockwise to a closed position. FIG. 25A depicts the spool valve 510 used by the valve system 500 in the alternative example embodiment of FIG. 24. In this example embodiment, the spool valve 510 includes a depressible cone 512 having an axial through port 514.

Figure 25B:
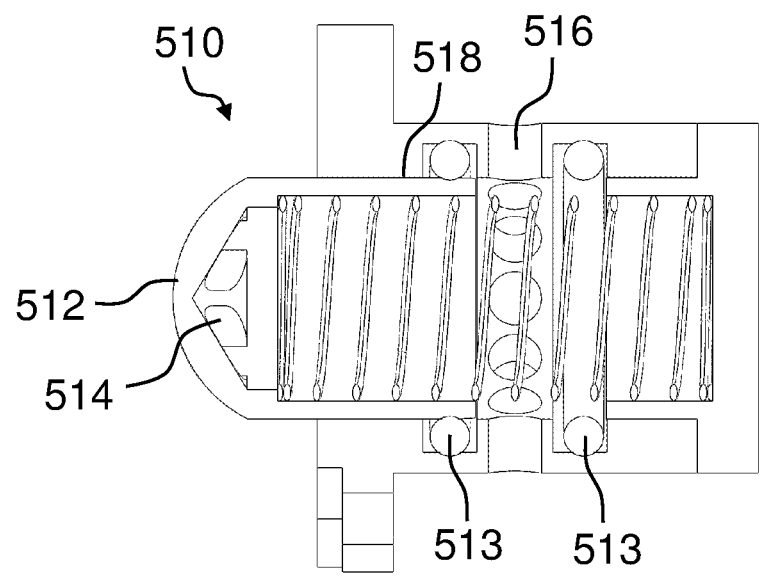
FIG. 25B is a cross-sectional view of the spool valve of FIG. 24 in an open and uncompressed position.

FIG. 25B is a cross-sectional view of the example spool valve 510 in an open and uncompressed position in which the depressible cone 512 protrudes into the chamber of the valve housing 430 that contains the arched valve foot 470. As shown in FIG. 25B, a plurality of lateral side ports 516 around the example spool valve 510 are not blocked by an outer surface 518 of the depressible cone 512 when the spool valve 510 is in the open and uncompressed position, allowing fluid to flow through the spool valve 510 via ports 514, 516, and therefore also through the second port 458.

Figure 25C:
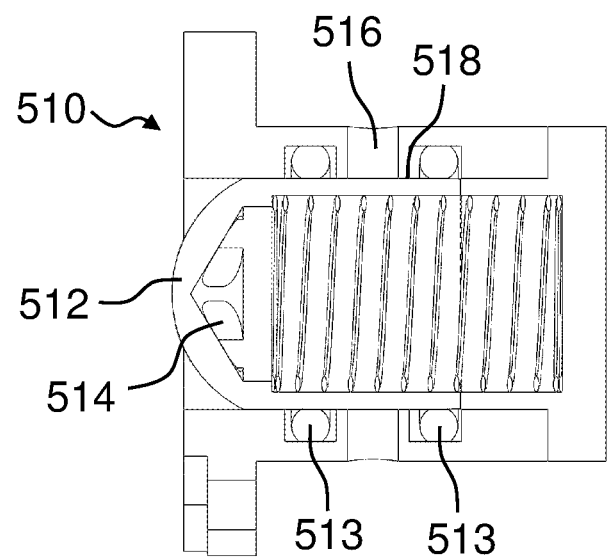
FIG. 25C is a cross-sectional view of a spool valve in a closed position, e.g., as compressed by contact with the arched valve foot of FIG. 24 when pivoted into a fully closed position.

FIG. 25C is a cross-sectional view of the example spool valve 510 in a closed position, e.g., as compressed by contact with the heel surface 404 of the arched valve foot 470 when it is pivoted counter-clockwise into a fully closed position. As shown in FIG. 25C, the side ports 516 are blocked by the outer surface 518 of the depressible cone 512 when the example spool valve 510 is in the closed and compressed position, so that the outer surface 518 of the depressible cone 512 and the O-ring seals 513 together prevent fluid from flowing through the spool valve 510 or the second port 458.

Figure 26:
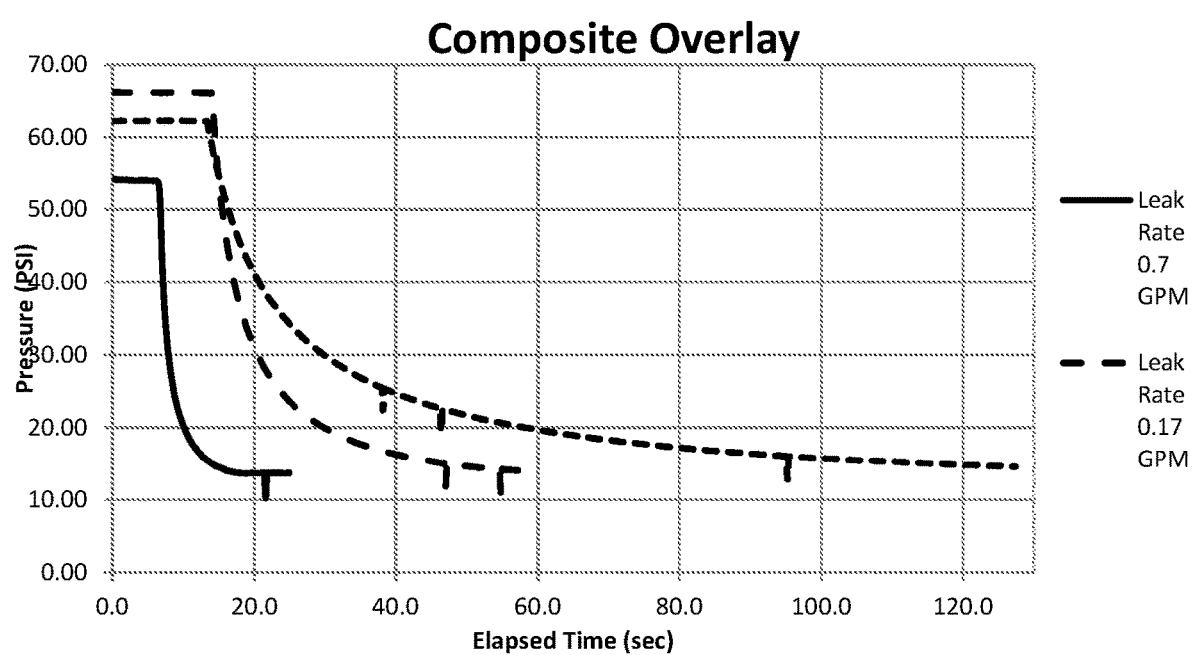
FIG. 26 depicts example decays in pressure measured downstream of a water main valve in the fully closed position, due to a downstream leak having different leak rates.

FIG. 26 depicts example decays in pressure measured downstream of a water main valve in the fully closed position, due to a downstream leak having different leak rates. As can be seen from FIG. 26, a greater leak rate correlates with a faster rate of change in pressure. Certain embodiments of the valve systems disclosed herein can be controlled to close when a downstream leak is determined based on flow rate data converted from transient decay of downstream pressure sensed by pressure sensor measurements. For example, in the example embodiment of FIG. 2, averaging initial pressure measurements from the first and second conventional pressure sensors 4 and 5, and then monitoring downstream pressure decay from that benchmark with the valve in the closed state, may increase the accuracy of calculated flow rate data. In this way, downstream leak flow rate data may be based on fluid pressure sensed by both of the upstream and downstream pressure sensors when determining the advent of a leak for signaling a need for controlled valve closure.

Note that normal operational flow rates may also be determined from the difference in pressures sensed by conventional pressure sensors 4 and 5, in view of the valve geometry and its predicted or measured characteristic of head loss versus flow rate at various angular positions of the valve foot.

Figure 27:
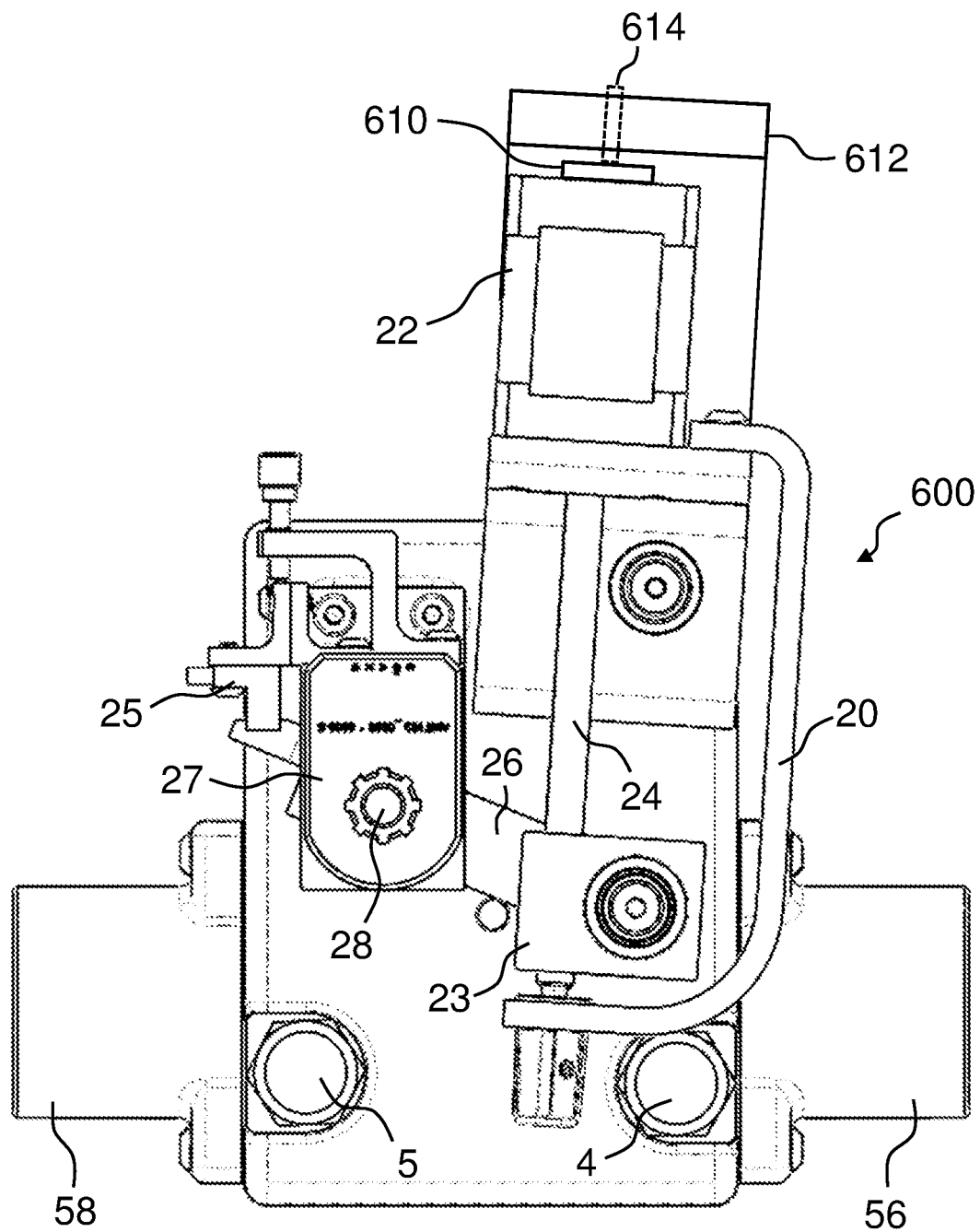
FIG. 27 is a back view of a valve system according to another embodiment of the present invention.

FIG. 27 is a back view of a valve system 600 according to another example embodiment of the present invention. The valve system 600 has many common components with the valve system 50 shown in FIG. 5, those common components having the same numbers and description applicable to FIG. 5, supra. In the embodiment of FIG. 27, the motor 22 is optionally seated in a motor fixture 612 that constrains rotation of the exterior of the motor 22 but clamps (using a set screw 614) the motor 22 axially against a miniature load cell transducer 610. In this way, the force exerted by the lead screw 24 on the lever 26 that turns the valve foot pivot shaft 28 can be sensed by the miniature load cell transducer 610.

In the embodiment of FIG. 27, a leak in the piping system downstream of the first port 56 (with the valve system 600 in the closed state) causes a decay in fluid pressure at the location of pressure sensor 4 relative to fluid pressure at the location of pressure sensor 5. The same pressure decay causes a force imbalance on the internal valve foot assembly and thus a change in torque at the valve foot pivot shaft 28. The change in torque at the valve foot pivot shaft 28 is sensed as an increasing reaction force on the motor fixture 612, which can be sensed by the load cell transducer 610. The clamping force added by the set-screw 614 can ensure that the load cell transducer 610 is always under compression, even in case of unfavorable differential thermal expansion of various components of the valve system 600, thereby improving the reliability of sensing changes in reaction force on the motor fixture 612.

In certain embodiments, increases in the reaction force on the motor fixture 612, as sensed by the load cell transducer 610, can be used by a processor (in conjunction with known information about the geometry and design of the valve system 600) to determine the presence and flow rate of a downstream leak without the use or need for either of the pressure sensors 4, 5. In certain such embodiments, the pressure sensors 4, 5 are optionally omitted in such reliance upon the load cell transducer 610.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably" is used herein to consistently include the meaning of "not necessarily" or optionally. "Comprising," "including," and "having," are intended to be open-ended terms.

We claim:

1. A fluid valve comprising:
   a housing comprising first and second ports and defining a fluid flow path between the first and second ports, the housing including an interior cylindrically-arcuate surface that defines a center of curvature, the fluid flow path passing through at least one opening in the interior cylindrically-arcuate surface;
   a foot having a bottom and a heel, the bottom facing the interior cylindrically-arcuate surface, the heel disposed transverse to the bottom, the foot extending in a radial direction away from the center of curvature, the foot pivoting within an operational angular range about the center of curvature, the bottom of the foot being configured to translate over the at least one opening in the interior cylindrically-arcuate surface, and the heel being configured to abut the second port with the foot pivoted to a closed position of the operational angular range;

wherein the interior cylindrically-arcuate surface defines a circumferential direction orthogonal to the radial direction, and the at least one opening is elongate in the circumferential direction and is disposed so that an area of overlap by the bottom of the foot over the at least one opening decreases as the foot pivots away from the closed position.

2. The fluid valve of claim 1, wherein the at least one opening has a varying width measured orthogonal to the circumferential direction and orthogonal to the radial direction, so that the area of overlap decreases non-linearly as the foot pivots away from the closed position.

3. The fluid valve of claim 1 wherein the second port includes a spool valve that protrudes towards the heel, and the heel contacts the spool valve of the second port as the foot pivots to the closed position.

4. The fluid valve of claim 1 further comprising a foot pivoting mechanism and a motor coupled to the foot pivoting mechanism, the motor controllably pivoting the foot within the operational range.

5. The fluid valve of claim 4 wherein the foot pivoting mechanism includes a lead screw that is rotated by the motor.

6. The fluid valve of claim 4 further comprising a limit switch, the limit switch interrupting the operation of the motor as the foot reaches a limit of the operational angular range.

7. The fluid valve of claim 1 further comprising an upstream pressure sensor, a downstream pressure sensor, and a microprocessor that determines a flow rate based on fluid pressure sensed by both of the upstream and downstream pressure sensors.

8. The fluid valve of claim 7 wherein the flow rate includes flow rate data indicative of a downstream leak.

9. The fluid valve of claim 5 further comprising a load cell transducer that is axially coupled to the motor, the load cell transducer sensing an axial reaction force acting upon the motor through the lead screw.

10. A fluid valve comprising:
a housing comprising first and second ports and defining a fluid flow path between the first and second ports, the housing including an interior cylindrically-arcuate surface that defines a center of curvature, the fluid flow path passing through at least one opening in the interior cylindrically-arcuate surface;
a foot having a bottom and a heel, the bottom facing the interior cylindrically-arcuate surface, the heel disposed transverse to the bottom, the foot extending in a radial direction away from the center of curvature, the foot pivoting within an operational angular range about the center of curvature, the bottom of the foot being configured to translate over the at least one opening in the interior cylindrically-arcuate surface, and the heel being configured to abut the second port with the foot pivoted to a closed position of the operational angular range;

wherein the at least one opening comprises a plurality of openings in the interior cylindrically-arcuate surface, the plurality of openings being disposed so a subset of the plurality of openings is overlapped by the bottom of the foot, that subset decreasing as the foot pivots away from the closed position.

11. The fluid valve of claim 10, wherein the housing is an extruded housing.

12. A fluid valve comprising:
a housing comprising first and second ports and defining a fluid flow path between the first and second ports, the housing including an interior cylindrically-arcuate surface that defines a center of curvature, the fluid flow path passing through at least one opening in the interior cylindrically-arcuate surface;
a foot having a bottom and a heel, the bottom facing the interior cylindrically-arcuate surface, the heel disposed transverse to the bottom, the foot extending in a radial direction away from the center of curvature, the foot pivoting within an operational angular range about the center of curvature, the bottom of the foot being configured to translate over the at least one opening in the interior cylindrically-arcuate surface, and the heel being configured to abut the second port with the foot pivoted to a closed position of the operational angular range;
wherein the valve is in a closed state that prevents fluid flow through the fluid flow path with the foot pivoted to the closed position and the heel abutting the second port; and
further comprising a shoe that compliantly extends radially outwards from the bottom of the foot and is preloaded to bear against the interior cylindrically-arcuate surface of the housing, the shoe sliding circumferentially relative to the interior cylindrically-arcuate surface as the foot pivots about the center of curvature.

13. The fluid valve of claim 12, wherein the shoe has a foot interface surface in sliding contact with the foot, the foot interface surface being oriented to permit and guide relative motion of the shoe relative to the foot in a direction radially towards or away from the center of curvature and to constrain relative motion of the shoe relative to the foot in other directions.

14. The fluid valve of claim 13, further comprising a complaint peripheral seal between the foot and the foot interface surface of the shoe.

15. The fluid valve of claim 14, wherein the peripheral seal has a U-shaped cross section.

16. The fluid valve of claim 14, wherein the first port is an outlet port and the second port is an inlet port and the fluid flow path leads from the second port to the first port unless the valve is in the closed state, and wherein the foot interface surface of the shoe is an inward-facing peripheral surface of the shoe.

17. The fluid valve of claim 14, wherein the first port is an inlet port and the second port is an outlet port and the fluid flow path leads from the first port to the second port unless the valve is in the closed state, and wherein the foot interface surface of the shoe is an outer peripheral surface of the shoe.

* * * * *